(12) United States Patent
Damberg

(10) Patent No.: US 12,167,175 B2
(45) Date of Patent: *Dec. 10, 2024

(54) HIGH BRIGHTNESS PROJECTION SYSTEMS AND METHODS

(71) Applicant: MTT INNOVATION INCORPORATED, Vancouver (CA)

(72) Inventor: Gerwin Damberg, Vancouver (CA)

(73) Assignee: MTT INNOVATION INCORPORATED, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,787

(22) Filed: Feb. 16, 2023

(65) Prior Publication Data

US 2023/0199156 A1    Jun. 22, 2023

Related U.S. Application Data

(63) Continuation of application No. 16/605,587, filed as application No. PCT/CA2018/050564 on May 11, 2018, now Pat. No. 11,611,728.

(60) Provisional application No. 62/505,827, filed on May 12, 2017.

(51) Int. Cl.
   *H04N 9/31* (2006.01)

(52) U.S. Cl.
   CPC ......... *H04N 9/3126* (2013.01); *H04N 9/3147* (2013.01); *H04N 9/3161* (2013.01); *H04N 9/3185* (2013.01)

(58) Field of Classification Search
   CPC .. H04N 9/3126; H04N 9/3147; H04N 9/3161; H04N 9/3185; H04N 9/3182; H04N 9/3179; G02B 5/0278; G02B 27/48; G03B 21/005; G03B 21/2033
   See application file for complete search history.

(56) References Cited

U.S. PATENT DOCUMENTS

| | | | |
|---|---|---|---|
| 5,612,753 A | 3/1997 | Poradish et al. |
| 5,905,545 A | 5/1999 | Poradish et al. |
| 7,551,341 B1 | 6/2009 | Ward et al. |
| 9,462,239 B2 | 10/2016 | Liu et al. |
| 9,983,545 B2 | 5/2018 | Gorny et al. |

(Continued)

FOREIGN PATENT DOCUMENTS

| | | |
|---|---|---|
| CA | 2917585 A1 | 11/2015 |
| CN | 101430492 A | 5/2009 |

(Continued)

OTHER PUBLICATIONS

Fairchild, M.D., "The HDR Photographic Survey", Color and Imaging Conference, pp. 233-238, Society for Imaging Science and Technology, 2007.

(Continued)

*Primary Examiner* — Michael E Teitelbaum
(74) *Attorney, Agent, or Firm* — HSML P. C.

(57) ABSTRACT

A hybrid projector architecture combines steered light with unsteered light. In some embodiments the steered light is narrowband light and the unsteered light is broadband light. Splitting between the steered and unsteered light may be determined based on luminance level. For example, the unsteered light may contribute a large proportion of the light for luminance levels up to a threshold. The steered light may contribute an increasing proportion of the light as luminance values rise above the threshold.

20 Claims, 26 Drawing Sheets

(56) References Cited

U.S. PATENT DOCUMENTS

| | | |
|---|---|---|
| 10,146,180 B2 | 12/2018 | Leister et al. |
| 10,531,055 B2 | 1/2020 | Richards et al. |
| 2004/0169774 A1 | 9/2004 | Hibi et al. |
| 2005/0007503 A1 | 1/2005 | Iwai et al. |
| 2005/0018150 A1 | 1/2005 | Kamijima et al. |
| 2005/0286101 A1 | 12/2005 | Garner et al. |
| 2009/0195709 A1 | 8/2009 | Kwon |
| 2010/0103246 A1 | 4/2010 | Schwerdtner et al. |
| 2010/0253863 A1 | 10/2010 | Harding et al. |
| 2011/0164191 A1 | 7/2011 | Brown |
| 2012/0038892 A1 | 2/2012 | Kurtz et al. |
| 2013/0093805 A1 | 4/2013 | Iversen |
| 2013/0201403 A1 | 8/2013 | Iversen |
| 2014/0043352 A1 | 2/2014 | Damberg et al. |
| 2014/0055755 A1 | 2/2014 | Fan |
| 2014/0078474 A1 | 3/2014 | Nakao et al. |
| 2014/0192076 A1 | 7/2014 | Tan et al. |
| 2015/0036057 A1 | 2/2015 | Richards |
| 2016/0119595 A1 | 4/2016 | Lyubarsky et al. |
| 2017/0078629 A1 | 3/2017 | Kozak et al. |
| 2017/0085846 A1 | 3/2017 | Damberg et al. |
| 2017/0257608 A1 | 9/2017 | Ikeda et al. |
| 2018/0173083 A1 | 6/2018 | Okumura |
| 2018/0308401 A1 | 10/2018 | French et al. |

FOREIGN PATENT DOCUMENTS

| | | |
|---|---|---|
| CN | 103119946 A | 5/2013 |
| CN | 103477640 A | 12/2013 |
| CN | 103631076 A | 3/2014 |
| CN | 103765869 A | 4/2014 |
| CN | 105612737 A | 5/2016 |
| CN | 106537899 A | 3/2017 |
| FR | 2986339 A1 | 8/2013 |
| JP | 2014517337 A | 7/2014 |
| JP | 7203758 B2 | 1/2023 |
| WO | 2012145200 A1 | 10/2012 |
| WO | 2015054797 A1 | 4/2015 |
| WO | 2015172236 A1 | 11/2015 |
| WO | 2015184549 A1 | 12/2015 |
| WO | 2015200138 A1 | 12/2015 |
| WO | 2016015163 A1 | 2/2016 |
| WO | 2017059537 A1 | 4/2017 |
| WO | 2018205036 A1 | 11/2018 |

OTHER PUBLICATIONS

Wu et al., "The Superposition Properties Analysis of LED Light Illumination Intensity", 2016.

Majumder et al., "Color nonuniformity in projection-based displays: analysis and solutions", 2004.

Notice of Reasons for Rejection issued Japanese Application No. 2022-209183, dated Feb. 13, 2024, with English translation.

Office Action issued in European Application No. 18797735.0, issued Jan. 25, 2023.

Office Action issued in Chinese Application No. 202210118921.2, mailed Sep. 19, 2023, 14 pages provided, with machine translation.

Office Action issued in Canadian Application No. CA2018050564, dated Sep. 10, 2024.

Office Action issued in Japanese Application No. JP2022-209183, dated Sep. 10, 2024, with English translation.

EVERY FRAME

HIGH BRIGHTNESS PROJECTION SYSTEMS AND METHODS

CROSS-REFERENCE TO RELATED APPLICATIONS

This application is a continuation of U.S. application Ser. No. 16/605,587 having a filing date of 16 Oct. 2019 which in turn is a 371 of PCT/CA2018/050564 having an international filing date of 11 May 2018, which in turn claims priority from U.S. application No. 62/505,827 filed 12 May 2017. For purposes of the United States, this application claims the benefit under 35 U.S.C. § 119 of U.S. application No. 62/505,827 filed 12 May 2017. All of the applications referred to in this paragraph are hereby incorporated herein by reference for all purposes.

FIELD

This invention relates to digital image projectors, for example, cinema projectors.

BACKGROUND

There is a desire for projectors that can provide viewers with a more realistic and/or more engaging viewing experience. Providing projected high dynamic range (HDR) images can improve the viewing experience. Providing high maximum brightness can also improve the viewing experience. However, even the most advanced cinema projectors currently available lack in-scene contrast and more importantly high peak luminance, both of which are important perceptual attributes for images to look realistic.

While a variety of research concepts from the field have made their way into commercial display products, large screen projectors have predominantly been carved out from practical innovations in computational display. For realistic image appearance, arguably the most important visual property of a display system is the range and number of light levels and colours that can be displayed. Unfortunately, increasing this range significantly in projectors, is prohibitively expensive, because peak luminance scales linearly with display power and light source cost, while brightness perception of luminance values is near logarithmic.

In some cinemas projected light is distributed over large screens. Even where the projectors have high light outputs the maximum achievable brightness (full screen white) may not be very bright due to the large screen area.

SUMMARY

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

The invention relates to architectures, components of and methods that may be applied in digital projectors. This detailed description explains various aspects of the invention in the context of an overall projector architecture as described in U.S. patent application Ser. No. 15/368,021 which is owned by MTT Innovation Incorporated and published as US patent publication No. US-2017-0085846 and which is hereby incorporated herein by reference for all purposes. The technology described herein is particularly beneficial for application in HDR (high dynamic range) projection systems. The technology described herein may be used in combination with apparatus and techniques as described in WO2017059537; WO2016015163; WO2015184549; and WO2015054797 all of which are owned by MTT Innovation Incorporated and all of which are hereby incorporated herein by reference for all purposes. These references provide example methods of light steering which may be applied in the context of the present application.

Figure 1:
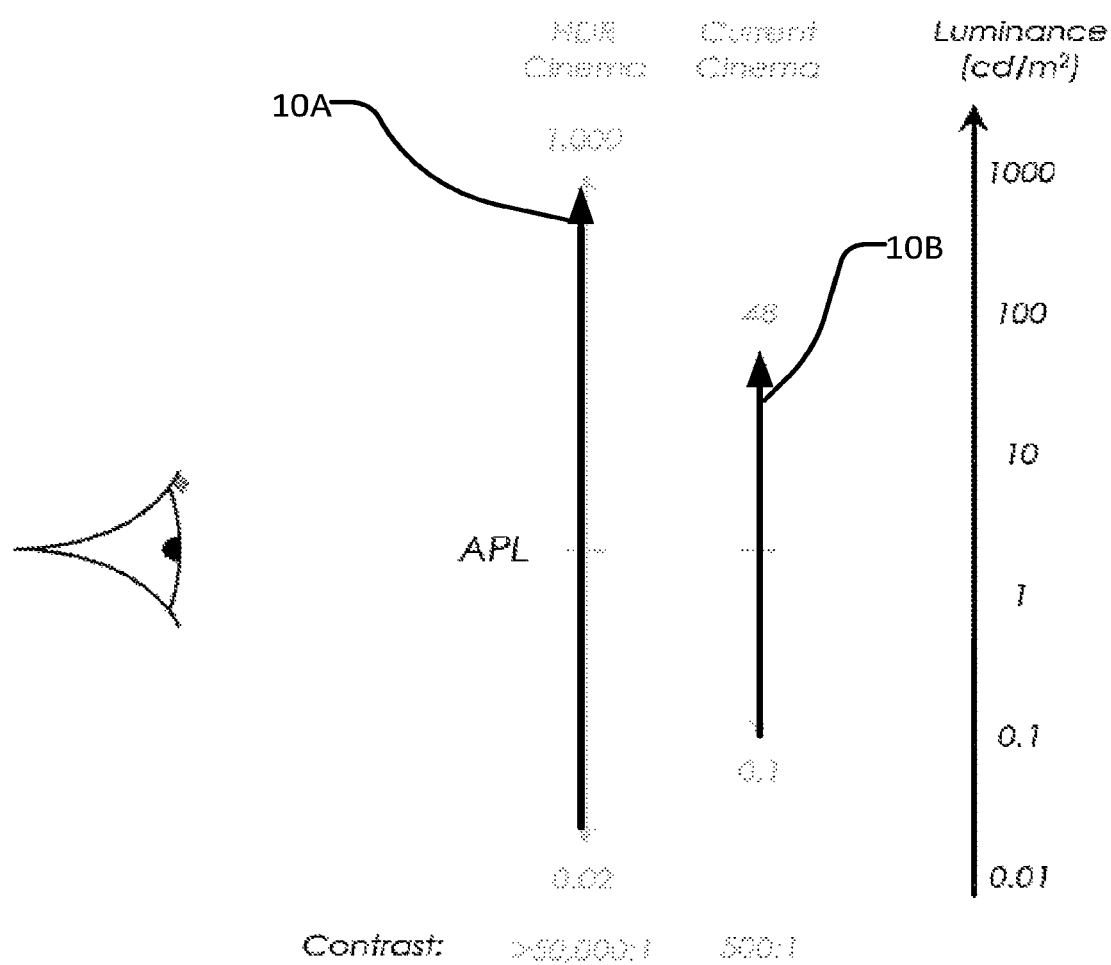
FIG. 1: Standardized cinematic SDR luminance range (yellow), compared to an example of the HDR luminance range that could be achieved with a light steering projector architecture (green) on a logarithmic scale to visualize approximate perceptual brightness impact.

Lamp power in a traditional (light attenuating) projection systems scales linearly with the desired peak luminance on screen, whereas the perception of these luminance values by the human visual system (HVS) is non-linear (near-logarithmic). The projector architecture described in U.S. Patent Publication US-2017-0085846 uses light steering to enable selected image features to be reproduced at significantly higher than full screen white (FSW) luminance levels. FIG. 1 compares on a logarithmic scale today's standardized cinematic SDR luminance range 10A in cinema (see Digital Cinema Initiative (DCI) specifications: peak luminance white is defined at 14 fL=48 cd/m²) with an example of the light steering luminance range 10B that is achievable in a projector architecture using light steering.

Image Statistics and Power Requirements

Some embodiments of the disclosed technology exploit the idea that characteristics of image content to be projected may be used to achieve tradeoffs between the goals of reproducing high brightness, high contrast HDR content and minimizing power and cost (light source). Experiments were conducted using an optical simulation and cost model of several projector architectures (described herein as a Light Budget Estimator or LBE) in combination with statistical analysis of a variety of representative theatrical HDR content.

Light Steering Efficiency

Figure 2:
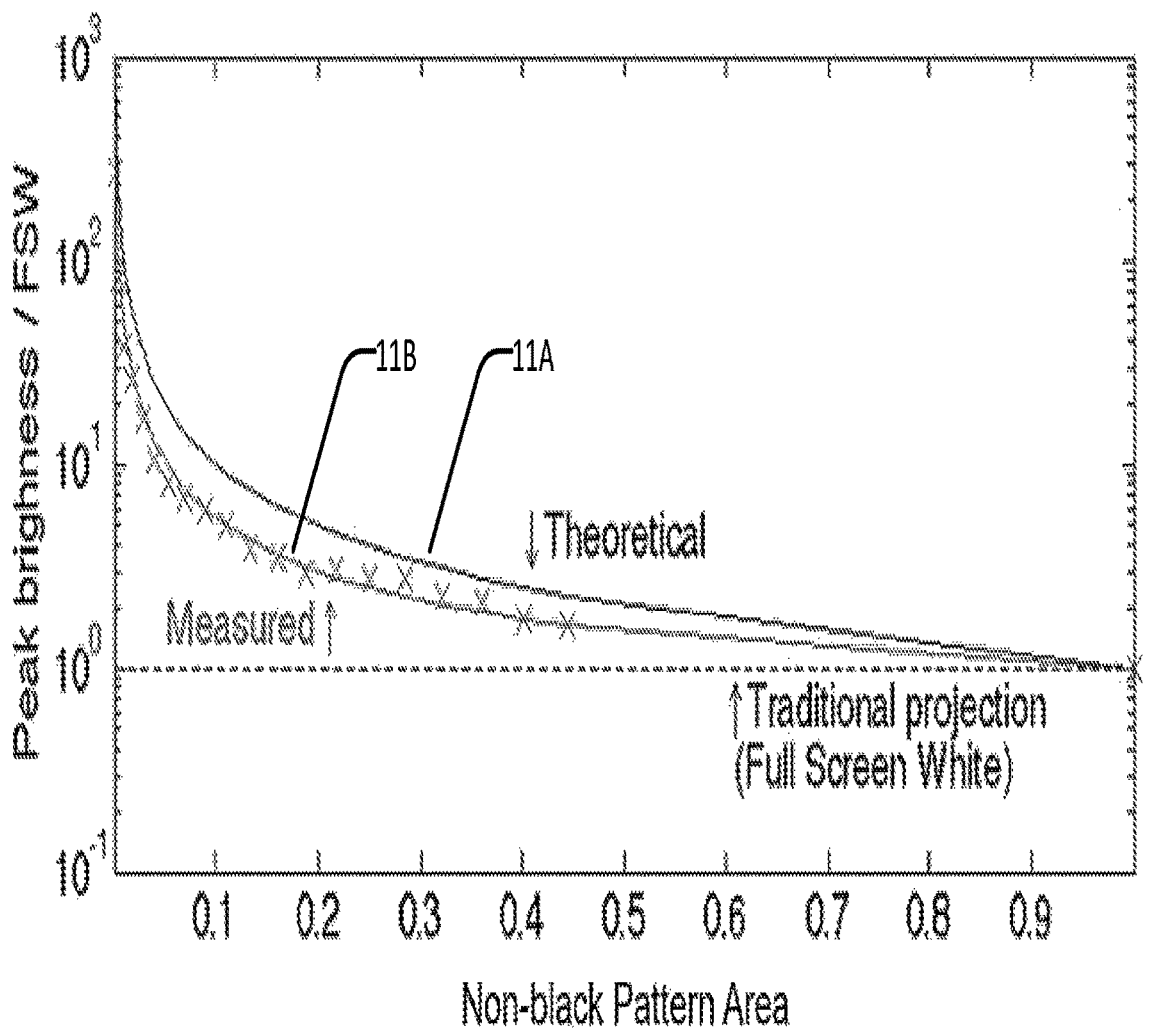
FIG. 2: Theoretical and measured steering efficiency for test patterns with varying mean luminance compared to a traditional projection system that uses amplitude modulation to form images.
Figure 2:

In an ideal light steering projector, all the available source light is used to form the image. In such an architecture, the power required to form an image is equal to the average (mean) luminance, or power of the target image. In a practical implementation the ability to steer light into very small bright features is limited for example by the system point spread function (PSF). FIG. 2 shows a selection of test patterns with identical minimum and maximum luminance in the source signal, but different mean luminance (power), reproduced on a light steering projector and on a traditional, amplitude attenuating projector. The solid curve shows the theoretical possible maximum peak luminance in an ideal light steering projector, which is:

$$L_{max} = \frac{1}{L_{mean}}. \tag{1}$$

Curve 11A indicates the theoretically achievable brightness as a function of non-black pattern area. Curve 11B shows actual measured data on an early light steering prototype. It can be seen that the steering efficiency is not 100%. The non-steered light is in part scattered to areas outside the projection screen. Some of the non-steered light is present on the screen and elevates the black level. The dashed line shows the maximum brightness of a traditional projection system that uses amplitude modulation to form images.

Component Efficiency

Each component in the light path of a projection system generally tends to reduce the total light throughput. For example, total achievable light throughput in a particular projector may be affected by the reflectivity of a phase modulator (often in the range of 65%-80%), losses due to higher order diffraction effects off the pixel grid as they appear on any regularly structured surface in the light path (often in the range of 40%-50% losses), as well as additional optical elements such as relay lenses, diffusers, broadband mirrors to fold the optical path and dichroic mirrors to combine or split colour channels.

Light steering requires additional optical components not found in a conventional projector. The presence of such components can reduce light efficiency. Total light efficiency of a prototype light steering projector was measured at approximately 5% from source light to screen. This inefficiency is balanced in part with the large gains in peak luminance due to light steering, but is overall costly, especially for images that have a high average picture level (APL). In an optimized system (custom coatings to light source wavelengths) the overall efficiency may be as high as 15%-25%, however this is still lower compared to a traditional projector architecture in which, for a full screen white test pattern, around 35-45% of source light can reach the screen.

Narrowband Light Sources

In the new HDR projector architecture the light steering efficiency, and with it the maximum peak luminance, is highest for well collimated, narrowband light. Laser diodes are well suited to the application. There are however several pitfalls when using laser diodes. These include:

Cost: other light sources, such as LEDs, lamps and laser+phosphor systems are as of today still more cost-effective in terms of output lumens per dollar.

Observer metamerism: the same measurable chromaticity coordinate made up from narrowband light sources will be perceived differently by different observers. This effect is less pronounced for light that is not narrowband.

Screen speckle: Small scale interference patterns from laser light can cause small spatial intensity variations on the projection screen that are disturbing. This effect is not visible for broadband light.

Some of these negative effects of using a laser light source can be countered by either breaking up some of the laser properties (for example by introducing a larger angular diversity) or by mixing light from laser and non-laser based light sources. More interestingly, many overall bright scenes, do not require a low black level, due to adaptation of the human visual system to the brighter parts of the image.

Full Light Steering Architecture

Figure 3:
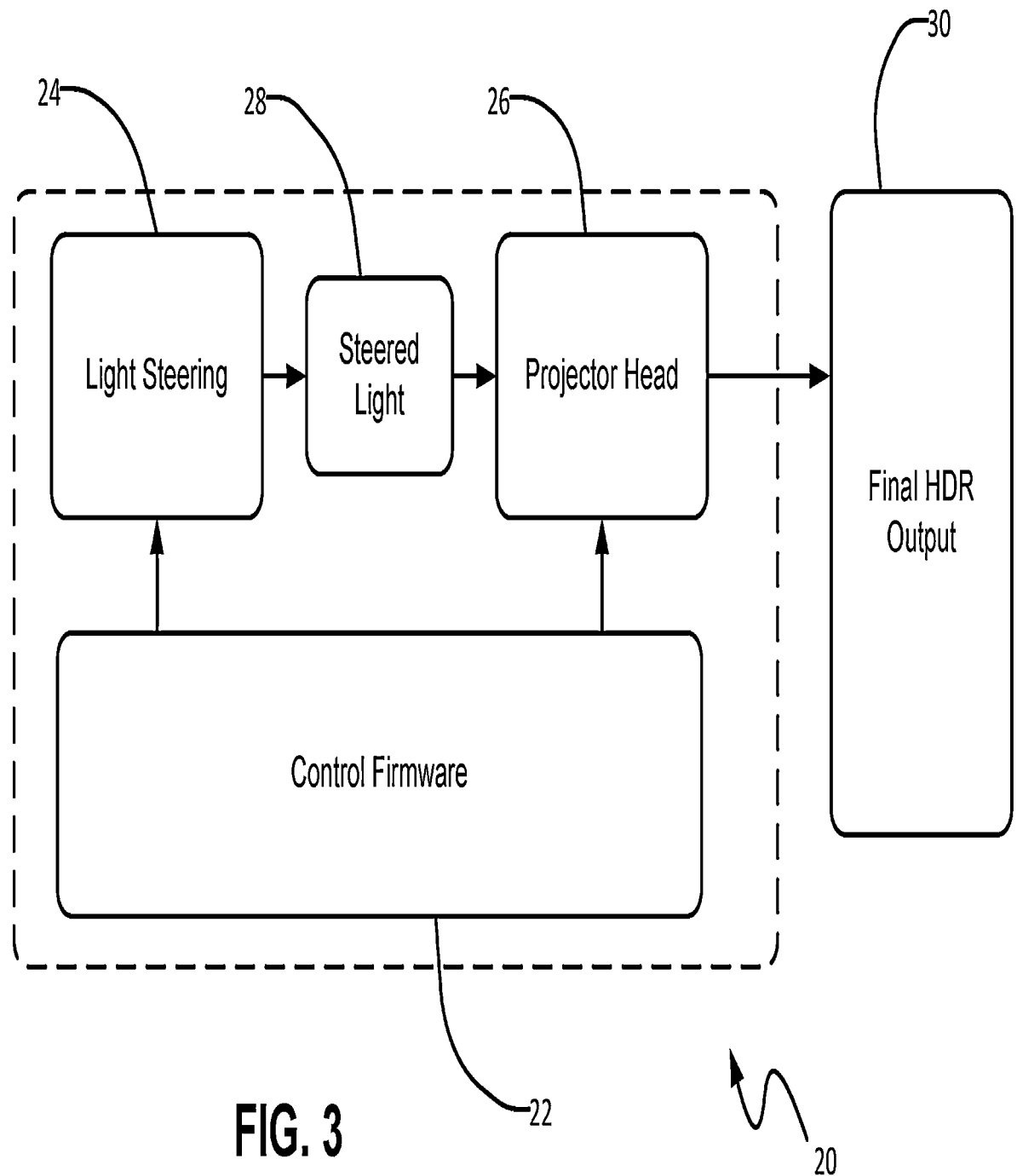
FIG. 3: Full light steering architecture with a total possible system efficiency of between 15-25%.

FIG. 3 shows a system architecture for a projector like that described in US patent publication No. US-2017-0085846 at a high level. In the full light steering architecture 20 control firmware 22 controls a light steering module 24 and a projector head 26. Light steering module produces a steered light image 28 that is projected by projector head 26 onto a screen to produce the final HDR output image 30. Control firmware 22 may, for example, comprise image processing and system control units. Light steering module 24 may include, for example, one or more RGB laser banks and may operate using free-space or fibre architecture. Projector head 26 may be a cinematic or consumer projector and may add detail layers including 4 k resolution, HFR and 3D effects, among others. This full light steering architecture has a total possible system efficiency in the range of about 15% 25% with currently available optical components.

Hybrid Light Steering Architecture

Figure 4:
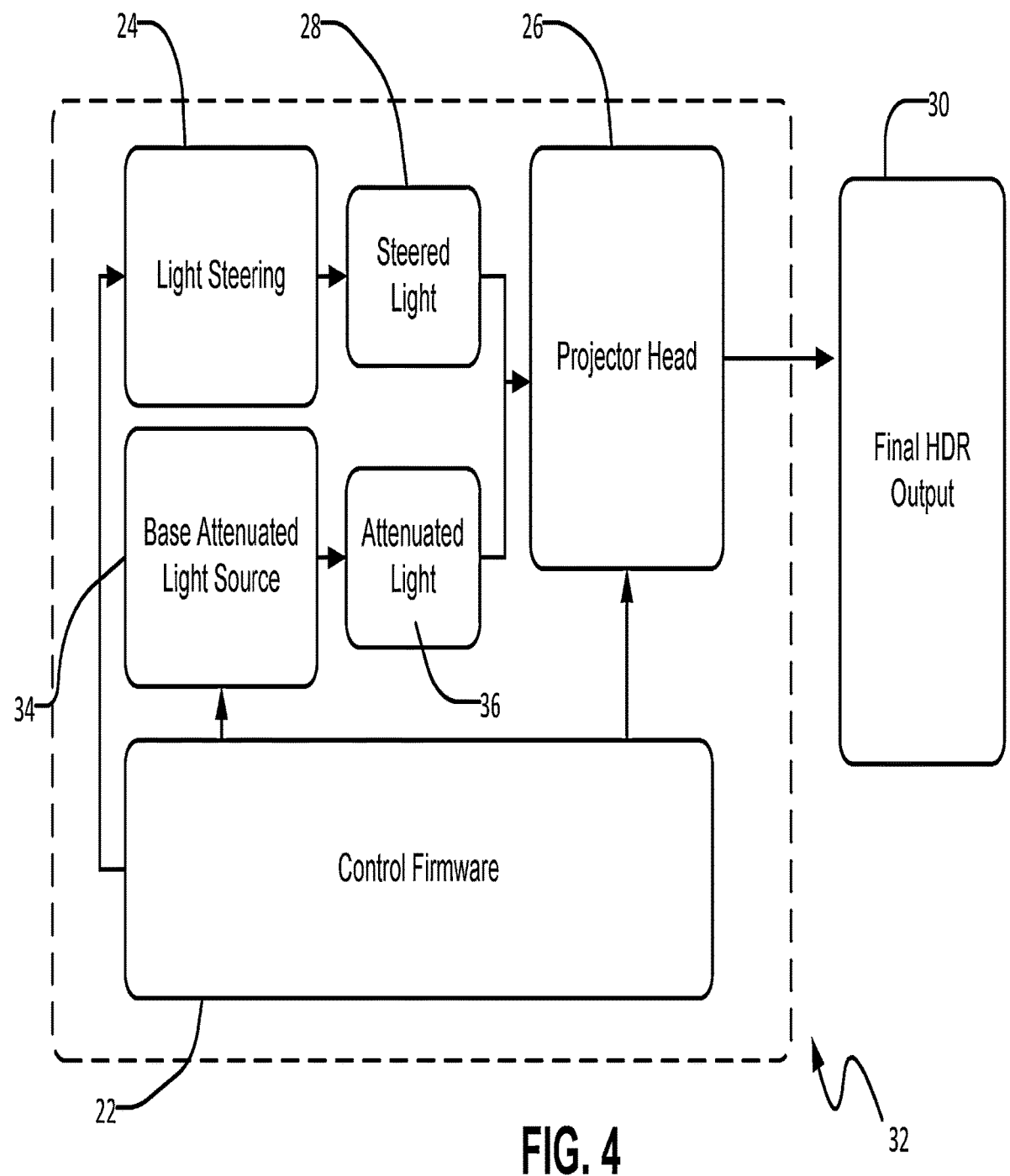
FIG. 4: Hybrid architecture to increase overall system light efficiency and reduce cost, while achieving comparable image quality to a full light steering projector. In this example the light efficiency of the steered light path is 13:5% and the light efficiency of the non-steered light path is 31:5%.

FIG. 4 depicts at a high level an example hybrid projector architecture 32. In projector 32, light steering of narrowband light is combined with broadband non-steered light (uniformly illuminating an amplitude modulator) into one system to reduce system cost further and mitigate certain image artifacts. This hybrid architecture may provide increased overall system light efficiency at reduced cost, while achieving comparable image quality to a full light steering projector.

In hybrid projector 32, control firmware 22 controls a base attenuated light source 34, a light steering module 24 and a projector head 26. Light steering module 24 produces a steered light image 28 which is combined with a base attenuated light image 36 produced by base attenuated light source 34.

In an example embodiment the resulting image might include 30% steered light and 70% base attenuated light. In an example embodiment, light steering module 24 may have an efficiency $\eta=0.4$ and the projector head an efficiency $\eta=0.45$. The combined image is projected by the projector head 26 to produce a final HDR output image 30. In this example the light efficiency of the steered light path is 13.5% and the light efficiency of the non-steered light path is 31.5%.

Hardware parameters may include the split of source light between the steering and non-steering parts of the system, as well as types of light source and associated cost and spectral properties.

Figure 5A:
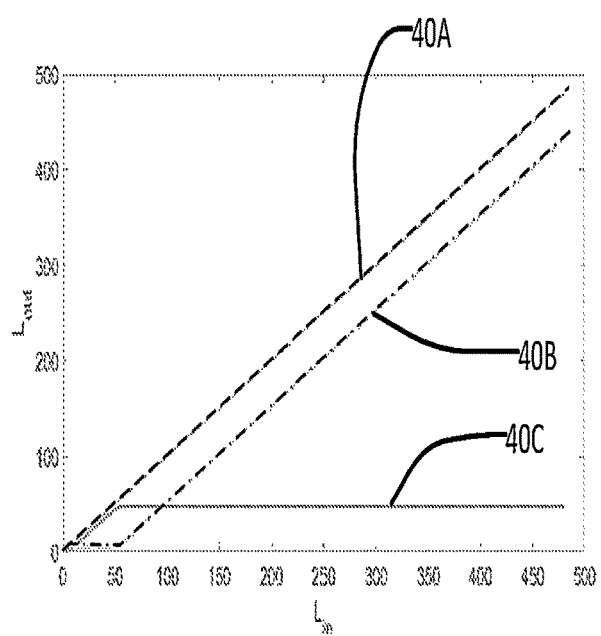
FIG. 5A: Linear showing a possible split of an input signal (black) between a light steering projector (green) and a nonlight steering projector (red).
Figure 5B:
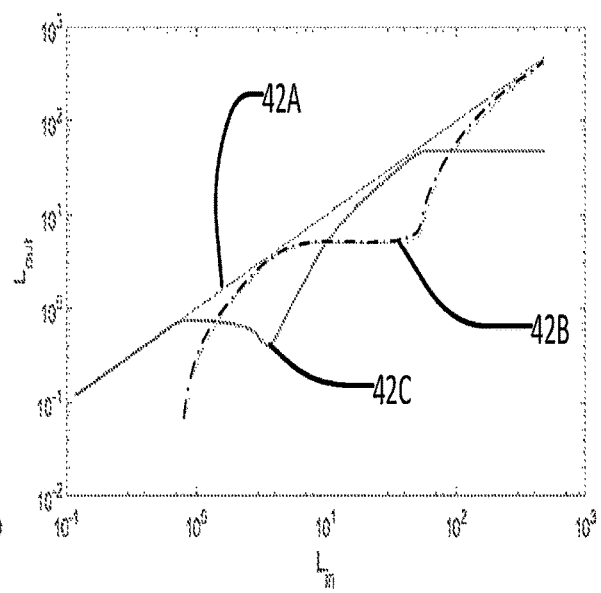
FIG. 5B: Log plot showing a possible split of an input signal (black) between a light steering projector (green) and a nonlight steering projector (red).
Figure 6A:
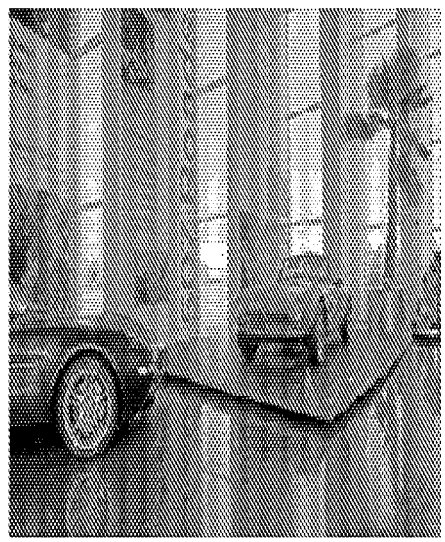
FIGS. 6A through 6D are example images from the image set.
Figure 6B:
Figure 6C:
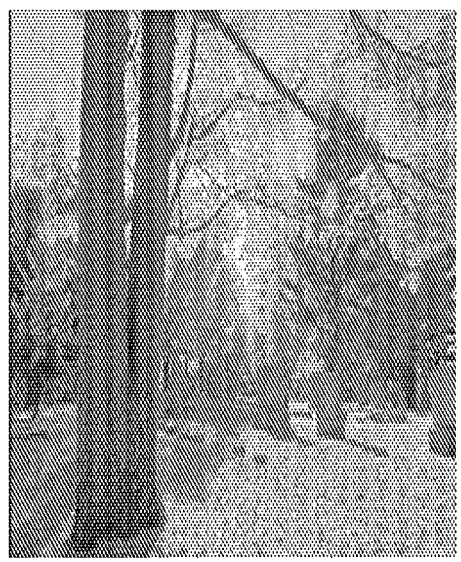
Figure 6D:

Software parameters may include aspects of the algorithm used to drive the system and allocate light between the steering and non-steering stages. FIGS. 5A and 5B show an example of splitting a linear input signal between a classical projector light path and a light steering path. FIG. 5A shows a linear plot of a possible split of an input signal 40A between a light steering projector 40B and a nonlight steering projector 40C. FIG. 5B shows a log plot of a similar split of an input signal 42A between a light steering projector 42B and a nonlight steering projector 42C.

A perceptually meaningful image quality metric may be applied to determine to what extent the desired target image colour and intensity has been faithfully reproduced.

In an example embodiment a hybrid projector may be a two-projector system comprising a non-steering projector and a light steering projector. The non-steering projector may, for example, comprise an off-the-shelf projector that uses amplitude modulation. The light steering projector may, for example, have a phase/amplitude modulation design.

This section discusses image statistics that were collected based on non-theatrical HDR image data (mapped to an approximate luminance range) as well as a simplified system model of a full light steering projector.

Average Luminance of HDR Images in Cinema

Little high brightness HDR video content is publicly available that has been colour graded for a theatrical viewing environment. Partially this is due to the current lack of sufficiently capable large screen projection systems. In this section we attempt to estimate the relative power required to reproduce HDR luminance levels up to 10 times above current peak luminance in cinema using colour graded HDR still images. An analysis of 104 HDR images has been performed, and power requirements for a light steering projector as in the proposed architecture has been estimated. In this theoretical exercise it was found that a light steering projector with less power than a traditional cinema projector can directly reproduce all images up to 48 cd/m$^2$ and almost all of the surveyed HDR images up to 480 cd/m$^2$ without the need for additional tonal compression. Table 1 summarizes the results.

TABLE 1

Power required to reproduce the images from the HDR data set on three different projectors (relative to a standard cinema projector in the first row).

| $L_{peak}$ | Steering? | $P_{rel}$ (min) | $P_{rel}$ (median) | $P_{rel}$ 90% tile |
|---|---|---|---|---|
| 48 cd/m$^2$ | no | 1 | 1 | 1 |
| 48 cd/m$^2$ | yes | 0.0107 | 0.1079 | 0.2595 |
| 480 cd/m$^2$ | yes | 0.0107 | 0.1832 | 0.8554 |

Methodology

Mark Fairchild's set of 104 scene-referred HDR images (Mark D Fairchild. The hdr photographic survey. In Color and Imaging Conference, pages 233-238. Society for Imaging Science and Technology, 2007.) was analyzed. FIGS. 6A through 6D are example images from the image set that was used in this study. The images differ in dynamic range from less than 1000:1 to over 10$^9$:1. Most images are of outdoor scenes. While the image data represents measured, scene-referred HDR (actual scene luminance levels) and is not intended for viewing on a cinema projector, an initial guess for a cinema-suitable rendering can be established by shifting the image intensity, so that the APL approximately matches the estimated viewer adaptation level in cinema. A simple linear scaling operator, $S_{adaptation}$, was determined manually for each image. Images were hand-tuned in a dark viewing environment, on a calibrated 27 inch reference monitor (Dell U2713HMt, calibration confirmed using a Photo Research Inc. PR-650 spectro-radiometer) which was set to a peak white luminance of 48 cd/m² (D65 white point). While adjusting the intensity the images were viewed from a distance of approximately 3-5 screen-heights.

Once an adequate brightness scaling factor had been determined, luminance levels above 10 times that of FSW, 480 cd/m², were clipped. Next, the steering efficiency of the proposed projector architecture was accounted for via a system PSF approximation (in this case a somewhat conservative, large Gaussian kernel spanning effectively 81 pixels of 1920 horizontal image pixels). The mean intensity across all pixels of the resulting luminance profile serves as an approximate metric for power requirements of a light steering projector.

Computational Steps:
  Compute scaled luminance: $Y_s = Y_{hdr} \times S_{adaptation}$
  Clip $Y_s$ to 10×48 cd/m² = 480 cd/m²: $Y_{sc} = \min(480, Y_s)$
  Account for steering efficiency: $Y_{scm} = Y_{sc} * g$
  Determine arithmetic mean luminance: $\overline{Y}_{scm} = \mathrm{mean}(Y_{scm})$
  Scale to reference $$(48\ \mathrm{cd/m^2}) : P_{rel} = \frac{\overline{Y}_{scm}}{48\ \mathrm{cd/m^2}}$$

Results

Figure 7:
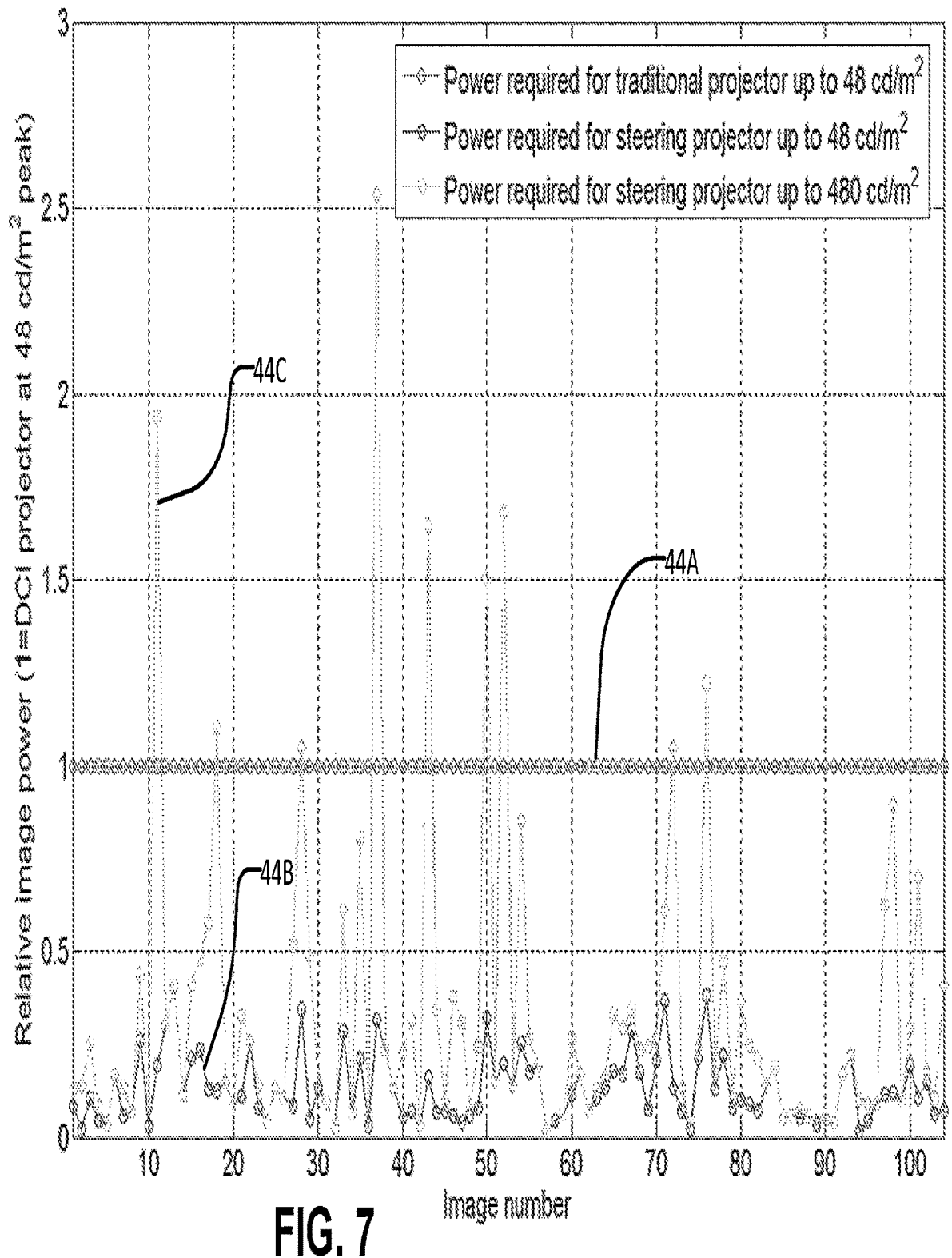
FIG. 7: Relative power required to reproduce each of 104 HDR images on three hypothetical projectors: two light steering projectors with a peak luminance of 48 cd/m$^2$ (blue) and 480 cd/m$^2$ (green) relative to a traditional, light blocking cinema projector with peak luminance of 48 cd/m$^2$ (red). The average power required to achieve identical peak luminance (48 cd/m$^2$) is on the order of 13% of a traditional projector. More importantly, all but the very brightest images (approximately 9% of all images under test), can be reproduced up to a peak luminance of 480 cd/m$^2$ while using less or the same amount of power.

FIG. 7 shows the estimated power required to reproduce each HDR image on a light steering projector with peak luminance identical to that of a traditional cinema projector, 48 cd/m², and of a light steering projector with a peak luminance one order of magnitude greater than cinema reference systems: 480 cd/m². All images can be reproduced on the 48 cd/m² light steering architecture using only a fraction of the power (13%) of a traditional projector. More importantly, almost all images can be reproduced up to 480 cd/m² (10× higher peak luminance) using the same or less power compared to a traditional projector.

In FIG. 7, the power required for a traditional projector producing up to 48 cd/m² is shown in traditional projector line 44A, the power required for a steering projector producing up to 48 cd/m² is shown in low luminance steering projector line 44B, and the power required for a steering projector producing up to 480 cd/m² is shown in low luminance steering projector line 44C.

The Average Picture Level (APL) of the data set when using the scale and clip operations described above with no further artistic colour corrections appears higher than what might be expected from cinema-ready high brightness HDR content. Some HDR content may have significantly lower APLs (e.g. approximately 3% and less). The power requirements for a light steering projector architecture used to project HDR content with lower APRs could be even lower (or peak luminance and contrast higher) than described herein.

Improved RGB Projector Prototype

An improved full colour RGB projector prototype incorporates the features listed in Table 2. These features may be applied individually or in any combinations. Details of the listed features are not intended to be limiting. Each of the listed features may be implemented using any of a variety of possible substitutable components. For example, while an LCoS based SLM is used as the amplitude SLM in the described prototype, other SLMs such as transmissive or reflective SLMs, liquid crystal display panels or digital micromirror devices (DMDs) could be used to modulate amplitude. Examples of technologies suitable for phase modulation or amplitude modulation are described in Rolf R Hainich and Oliver Bimber. Displays: fundamentals & applications.CRC press, 2016; and David Armitage, Ian Underwood, and Shin-Tson Wu. Introduction to microdisplays, volume 11. John Wiley & Sons, 2006. Which are hereby incorporated herein by reference for all purposes.

TABLE 2

RGB High Power Prototype Features

| Feature | Comment |
|---|---|
| Full colour | R, G, and B primaries (e.g. at 462 nm, 520 nm and 638 nm) |
| Higher power | Arrays of individual diodes independently collimated |
| Intensity control | Source intensity adjustable per frame |
| Phase SLM | Select between custom Holoeye ™ PLUTO and LETO devices |
| Amplitude SLM | LCoS based (higher native contrast compared to DMD) |
| Synchronization | Theoretical analysis of timing for DMD implementations |
| Algorithm | Calibrated forward model |
| PSF | Measured, synthesized and incorporated into forward model |
| HDR Content | Colour graded and tone-mapped theatrical HDR content |

Architecture of the RGB Projector Prototype

Figure 8:
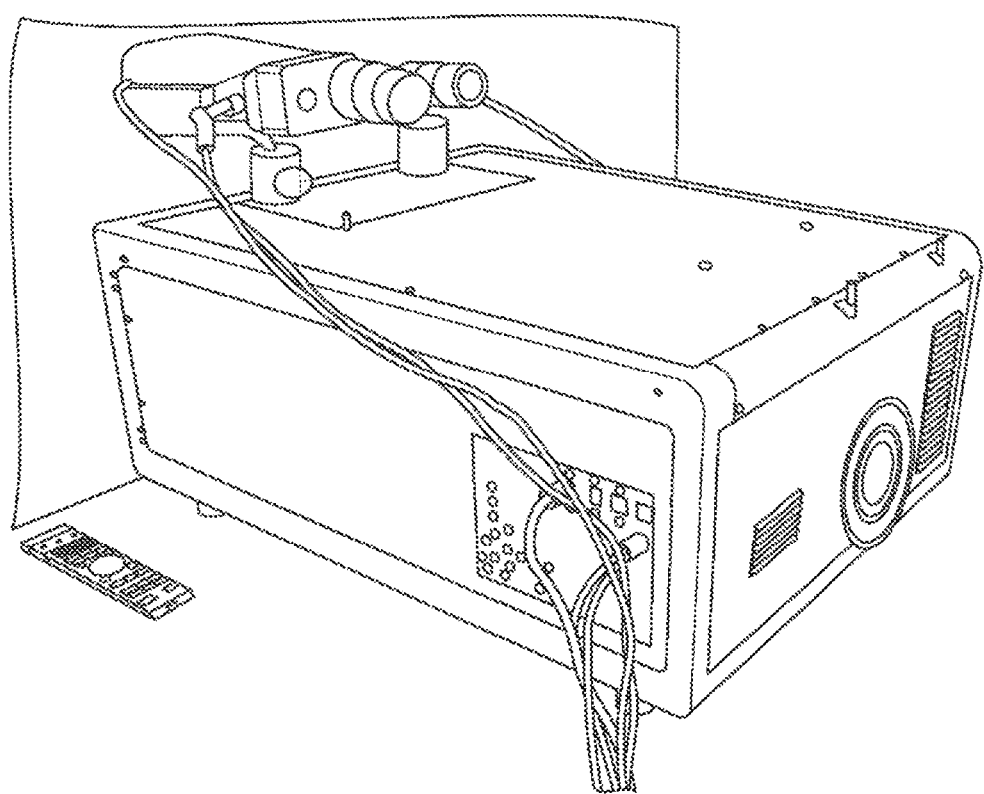
FIG. 8: Photo of the completed RGB prototype in the dark lab.

FIG. 8 is a photograph of a completed RGB prototype projector that implements features from Table 2. Top mounted are a machine vision camera as well as a spot-spectroradiometer for colour calibration.

Colour

A light source comprising red, green and blue laser diodes enables us to design a full colour projector. The prototype embodiment uses native laser diodes that emit light at wavelengths of 462 nm, 520 nm and 638 nm. The prototype embodiment has a parallel architecture in which three monochromatic light paths, including light sources, phase modulators and optical components are combined into a white beam with dichroic colour filters and then relayed into an amplitude-modulating projection head. In other embodiments, a field sequential system (e.g. in which a red, green and blue light field are presented in sequence) may be employed. In further embodiments a parallel or sequential architecture could employ a greater or lesser number of light wavelengths. In some embodiments light in four or more wavelengths is produced in parallel or presented in sequence. In addition to narrowband light sources, the architecture of some embodiments may include broad band and/or full spectrum light sources.

Figure 9:
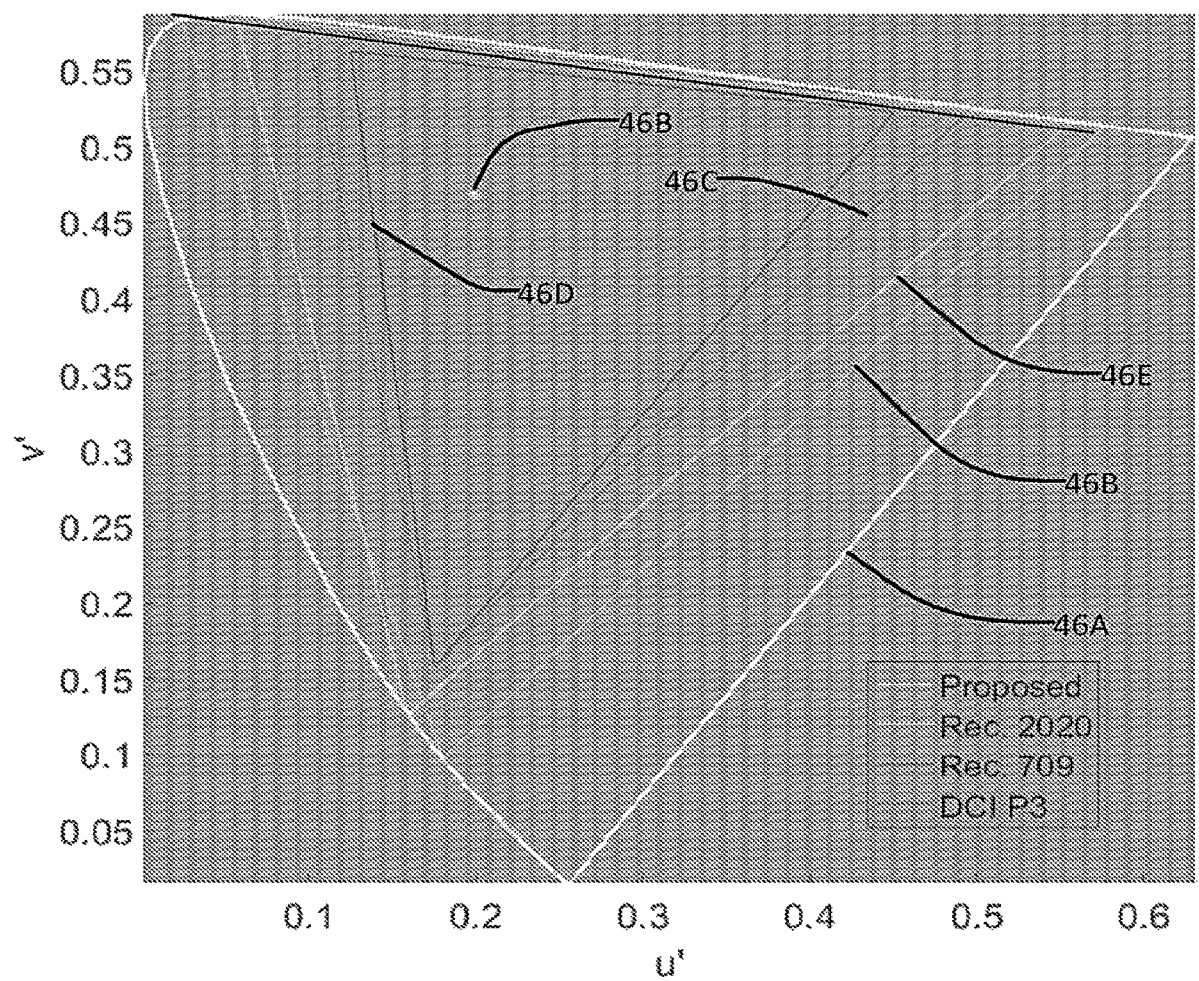
FIG. 9 is a chromaticity diagram comparing chromaticity of an example projector to several common colour standards.

The range of achievable chromaticities of the prototype can be seen in the chromaticity diagram in FIG. 9 relative to other common display and cinema primaries. The CIE 1976 Uniform Chromaticity Scale (UCS) 46A using u' and 'v' as chromaticity coordinates provides a perceptual more uniform relation between individual colours (i.e. the perceived difference between colours of equal distance from each other is comparable). The starred data point 46B represents the D65 white point, common in cinema and home display systems. The proposed chromaticity space 46B that can be reproduced with the prototype is significantly larger than and includes both the DCI P3 space 46C as well as the Rec.

709 46D space. It almost entirely includes the Rec. 2020 46E colour space and exceeds it in area.

Optical Power

The optical power of the prototype proof-of-concept projector was measured as 10 lumens out of lens. Projectors with greater light source power could be employed to increase the out of lens luminance and increase the potential luminance of the steered light. 100 to 200 lumens of steered light as a goal for the new prototype present a meaningful stepping stone. However the required light source power cannot easily be achieved with existing laser diodes. Three laser diode properties are of interest: the total power of the laser diode as well as the emitter dimensions and the divergence of light as it is emitted. Beam expansion, collimation optics and tilting of multiple laser diodes at the light source may be implemented using a mechanical design in which the individual components can be adjusted, some at 6 degrees of freedom.

Speckle

As with any display based on narrow band or monochromatic light sources (such as LEDs or lasers) care needs to be taken to manage undesirable properties such as inter-observer metamerism variations and speckle. There are typically three measures that can be taken to reduce the visible speckle contrast to the observer: randomization of polarization, increasing angular diversity of light in the optical path and broadening of the light source spectrum. While not the focus of this work, elements of any or all of these three methods can be applied in projectors as described herein.

While the projection head utilized in our RGB prototype is based on LCoS technology which requires linearly polarized input it is in principle possible to randomize this polarization after the final image has been formed either before or after the projection lens. Similarly, if the light steering method is coupled with a DMD-based projector head, then polarization can be randomized within the projector light path following phase modulation and prior to the DMD amplitude modulation, since the DMD does not require linearly polarized light at the input. Light within our light steering system is ideally collimated well. This translates to a high f-number (f #) optical system and with that limited angular diversity. While it is important to preserve this high degree of collimation for the light steering part of the system, this property of light is no longer required after an intermediate image has been formed.

The f # can then be reduced, for example with a light shaping diffuser, to match the input acceptance angles of the following optics resulting in higher angular diversity of the beam and with it less visible speckle. Moving the diffuser inside the projector randomizes the angular spread of light over time and further reduces visible speckle contrast. This can be achieved for example by rotating a diffuser disc within the projector or by linearly displacing optical elements at or near the diffuser.

A second and effective method to reduce speckle contrast is the introduction of movement to the projection screen. A slight continuous displacement of the screen surface has the effect of averaging over many angles as light from the projection lens reflects off the (non-flat) surface of the screen. Equally effective, but much less practical in a cinema setting, is the movement of the observer.

By employing binned and calibrated laser diodes that, for each colour, include laser diodes having different center wavelengths, the effective spectral band of the light source can be broadened, which reduces visible speckle contrast. The broadening of the light source will result in a superimposed set of slightly magnified and demagnified images for each colour channel after steering the light, which can be modelled by a small blur kernel and is not necessarily undesirable.

Synchronization

The phase SLM and the amplitude SLM, as well as a Pulse Width Modulation (PWM) dimmable laser light source need to be synchronized, ideally at the frame or subframe level. The amplitude modulator in the prototype is from a consumer projector and exhibits undesired latency of multiple frames within its built-in image processing block that we account for. In cinema, binary DMDs are used predominantly as amplitude SLMs in order to handle large projector light output and to comply with certain standards (e.g. the DCI). The temporal considerations section below discusses new drive schemes (timing) that aim at mitigating anticipated temporal artifacts (e.g. flicker.

Temporal Considerations in HDR Projection Displays

While parts of the prototype were built based on commodity consumer hardware, the use of development kits, together with customized light source control electronics allows for better synchronization of pulses from the light source (laser intensity modulation), digital pulses codes required to address the phase modulator (bit planes within a subframe), and for example a binary primary amplitude modulator in the projector head (DMD mirror states). We explore different solutions for synchronized drive schemes. This section discusses synchronization options for DMD based projector architectures.

LCoS Based Phase Modulator

The phase modulator we selected for the light steering projector implementation currently uses an LCoS micro display with a digital back plane and no input or output polarizing filter. The backplane updates in a vertical, top to bottom scrolling fashion. Either one or two lines are updated at a time. The relatively slow response of the liquid crystal material relative to the fast pulse codes of the back plane make it possible to achieve effectively a near-analogue phase response of the display. This is advantageous as synchronization to the fast, binary states of a micro mirror based projection head is less of an issue compared to truly binary, fast LCoS devices (e.g. ferroelectric devices).

Important for Our Application are:
  The overall refresh rate of the phase modulator (the refresh rate needs to be in line with the required video frame rate of the overall projector).
  The phase accuracy over the period of a frame (how reliable does the phase modulator reproduce a given phase value based on the corresponding drive level).
  The phase stability within a frame (to what extent are individual digital pulses from the back plane measurable in the overall phase response (phase flicker) and how does this affect light steering).
  Phase drift within a sub-frame between each line update.

In a calibrated LCoS device, per pixel, crystals will drift towards $2\pi$ or $0\,\pi$ respectively when an electric field is applied or removed. The response time can be thought of as the time from when the electric field is applied continuously to the time when the liquid crystal produces a $2\pi$ phase shift. Response time can be tuned with the chemical formulation of the liquid crystal.

Figure 10:
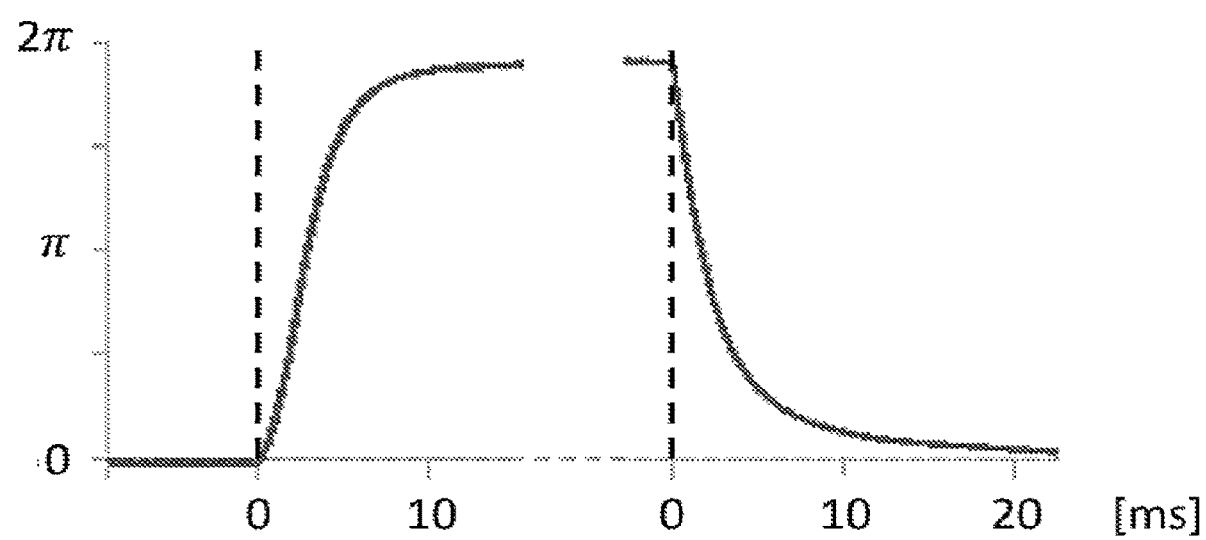
FIG. 10: Typical relative rise (left) and fall (right) times for the phase modulator between 0 and $2\pi$.

FIG. 10 shows an example of the rise and fall characteristics of a phase-only micro-display. FIG. 10 shows typical relative rise (left) and fall (right) times for the phase modulator between 0 and $2\pi$ If the target phase response is between 0 and $2\pi$, voltage can be periodically applied and removed to achieve intermediate phase retardation.

A circuit generating the periodic voltages has a frequency governed by the spatial resolution of the micro display and the bit precision of phase control. The liquid crystal response time is tuned to give the most stable image given the update frequency from the driving circuitry.

The driving circuit used in the current prototype is an FPGA operable to change the state of the driving on/off voltage at 7 kHz, in which case the pixel array is updated line by line starting at the top. The update of one bitplane across the entire frame therefore takes 1/7,000s (or around 145,000 ns).

Figures 11A, 11B, 11C:
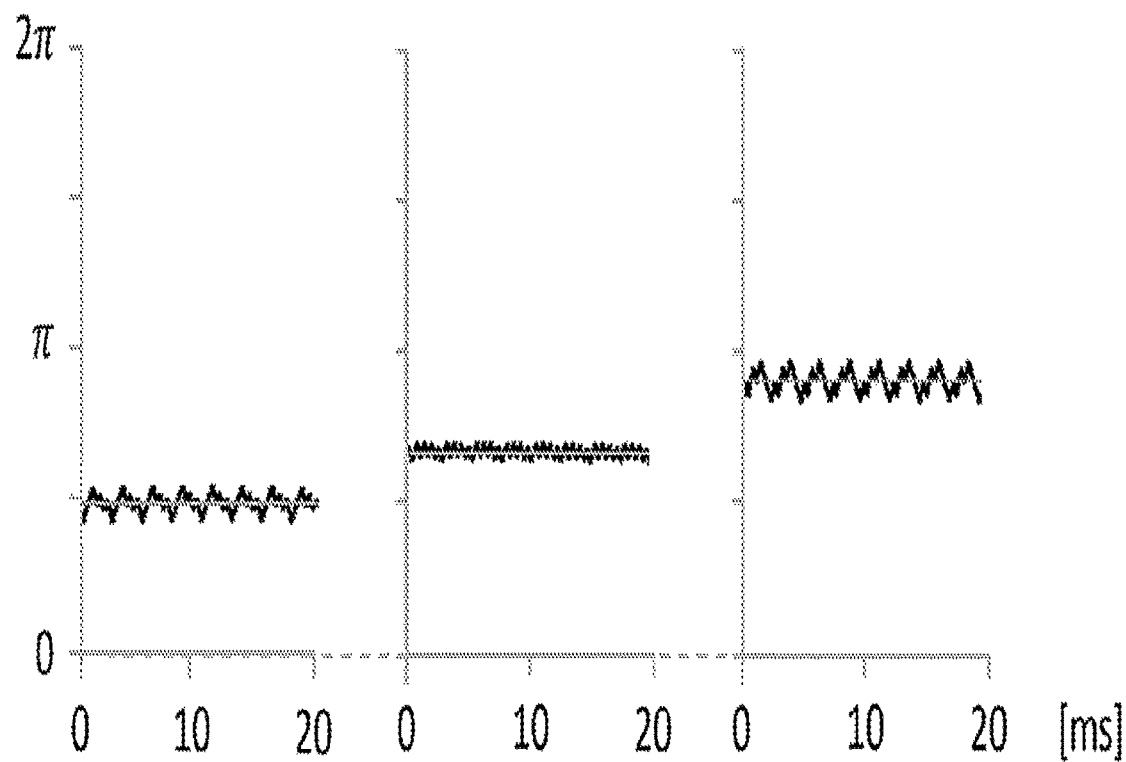
FIG. 11A: Sub-frame phase response at drive level 65 out of 255.
FIG. 11B: Sub-frame phase response at drive level 75 out of 255.
FIG. 11C: Sub-frame phase response at drive level 100 out of 255.

An example of variations in phase stability and phase drift of the current system can be seen in the measurements in FIGS. 11A through 11C in which the liquid crystal orientation is balanced in a half turned state by a periodic square wave voltage being applied.

FIGS. 11A, 11B and 11C show sub-frame phase response at drive levels 65 (left), 75 (center) and 100 (right) out of 255. The small scale temporal ripple is what we refer to as phase flicker, and the deviation around the average value as phase stability.

The total rise response time is 8.7 ms and the total fall response time is currently 21 ms. The cell thickness for the particular panel under test was not customized for the application and provides sufficient phase retardation all the way into the Infrared (IR) part of the light spectrum. The cell thickness is hence thicker than it needs to be. For example with this particular panel the maximum possible phase retardation for a blue laser diode can be up to 6 π and for a red laser diode can be close to 3π. A faster response time can be achieved by reducing the cell thickness to provide no more than the maximum required phase retardation per wavelength. Furthermore the lensing (steering) function can and should account for the effective refresh rate of the phase modulator via a simple model. As a new frame arrives, the driving state of all pixels is updated on the next refresh cycle.

Fast response time and high phase stability are somewhat opposing goals along one shared dimension of temporal control. This is because within the duration of a video frame, applying a continuous electric field early on will allow the crystals to move into the correct position quickly (after which the electric field should be removed or only pulsed on occasionally), whereas phase stability throughout the entire video frame is best achieved by having the on and off states of the electric field spread relatively evenly throughout the duration of the video frame. Both goals could eventually be accounted for in the lensing algorithms as well as in the underlying digital update scheme of Pulse Code Modulation (PCM) used to map phase code words to the optical phase response.

The functions provided by the FPGA in the current prototype system may also be provided by a dedicated ASIC. An ASIC may provide a higher update rate (e.g. 15 kHz). In the phase stability plots in FIG. 11 one would then see twice as many peaks and valleys during the same time period.

Additionally, there are options to modify or re-formulate the birefringence properties of the LC material used in the current phase modulator to enable a faster response time (for example 2× improvements).

DLP Technology Characteristics

DLP technology makes use of a binary modulator which flips per-pixel micro mirrors back and forth across their diagonals. Each mirror at any time can be either in the ON state in which it directs light rays to the screen or an OFF state in which it directs light rays to an off-screen location, the so-called light dump area. A mirror creates grey scales by flipping back and forth rapidly. For example over the course of a video frame it would spend more time in an on state to render a brighter pixel or more time in an off state for a darker pixel.

Figure 12:
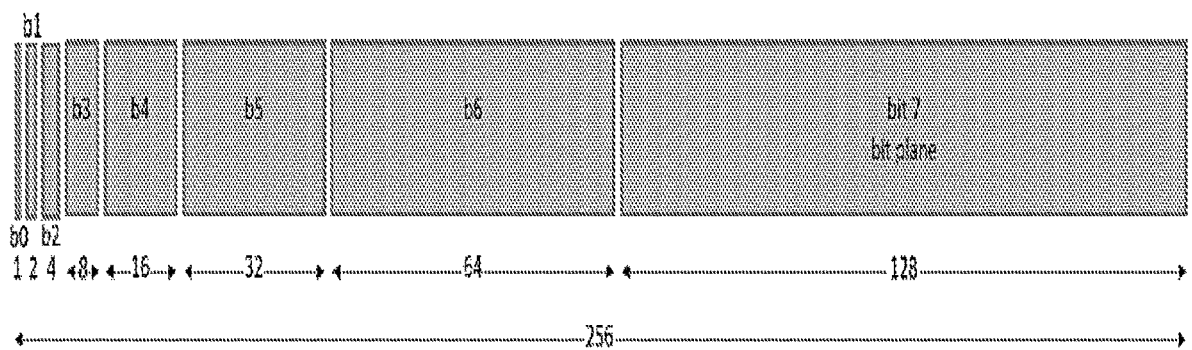
FIG. 12 shows a high level working principle of DMD timing.

Typically, each pixel is controlled by an 8 bit (or more) grey scale drive value per frame of video (usually 60 Frames per Second (fps)). FIG. 12 shows an example of how these grey scales may be translated into mirror flips. FIG. 12 is an illustration of DMD timing as a high level working principle (reproduced from T1 DLP documentation depicting the conceptual bit partition in a frame for an 8-Bit colour).

Whether a bit is set to 0 or 1 determines whether the mirror is flipped to the ON or to the OFF position. The bit position determines the relative duration of time that the mirror remains in the state. The maximum number of flips per second that the mirrors can typically achieve is just under 10 kHz (see FIG. 12; up to 80 kHz have been reported for professional applications), thus for this estimation we set the shortest period of a mirror state to 0.1 ms or 100,000 ns). We will refer to this as the mirror flip period equal to the period of b0 in the diagram in FIG. 12.

Asynchronous Light Pulses

If a pulsed light source is used (for example to produce light at 50 percent of the maximum level), flickering will occur if the off and on pulses are asynchronous to the mirror flipping and the periods of off and on significantly differ from frame to frame on a static image due to for example a low pulse frequency of the light state.

Figure 13A:
FIG. 13A is a relative timing diagram showing a first frame of a pulsed light source operating with a DMD using slow, asynchronous light pulses.
Figure 13B:
FIG. 13B is a relative timing diagram showing a second frame of a pulsed light source operating with a DMD using slow, asynchronous light pulses.

FIGS. 13A and 13B are relative timing diagrams for two frames of a DMD operating with a pulsed light source using slow, asynchronous light pulses. In FIG. 13A note how in frame 1 the light is on for ⅖ of the time and in frame 2 in FIG. 13B the light is on ⅗ of the time due to the fact the signals are asynchronous. If the OFF and ON light source periods are short relative to the mirror flip period, the difference between OFF and ON periods between static frames should be drastically reduced and be imperceptible to the human eye.

Figure 14A:
FIG. 14A is a relative timing diagram showing a first frame of a pulsed light source operating with a DMD using fast, asynchronous light pulses.
Figure 14B:
FIG. 14B is a relative timing diagram showing a second frame of a pulsed light source operating with a DMD using fast, asynchronous light pulses.

FIGS. 14A and 14B show relative timing diagrams for two frames of a DMD operating with a pulsed light source in which the light source is modulated significantly faster than the shortest possible mirror flip period.

In FIGS. 14A and 14B note that only a single minimum width mirror flip is shown with a drive value of 1, and the light state is analogous to the PWM clock described below. Also note that in this example the light is on 27/54 in frame 1 and 28/54 of frame 2.

Synchronous Light Pulses.

Figure 15:
FIG. 15 is a relative timing diagram of a pulsed light source operating with a DMD using slow, synchronous light pulses.

If the light source OFF and ON periods are synchronous to mirror flips (such as in FIG. 15), there should be practically no intensity difference between static frames and the light source pulse generator need only run at the period of the mirror flips, which in turn can drastically reduce the requirements of the control solution and impact Electromagnetic Interference (EMI) considerations. FIG. 15 is a relative timing diagram for a frame of a DMD operating with a pulsed light source using slow synchronous light pulses.

When a new frame arrives, the mirror flip logic for all pixels can be updated simultaneously via a double buffering scheme (or in blocks from top to bottom if desired).

Laser Control Solution.

We selected the iC-Haus iC-HG device (iC Haus GmbH. ic-haus homepage—product: ic-hg. http://ichaus.de/HG, 2017.) to directly drive laser diodes at high current and the option to pulse at very high frequency. The device has up to 200 MHz switching capability from a differential pair input. Synchronized switching of up to 100 MHz of a 500 mW (optical power or 650 mA and 2:2V electrical power per diode) 638 nm laser diode array was confirmed. A constant voltage input to the iC-HG sets the current limit in the ON state. We drive the constant voltage current input with a high speed Digital-to-Analog Converter (DAC).

Combining LCoS Phase Modulator, Binary DMD-Based SLM, and Pulsed Lasers.

Figure 16:
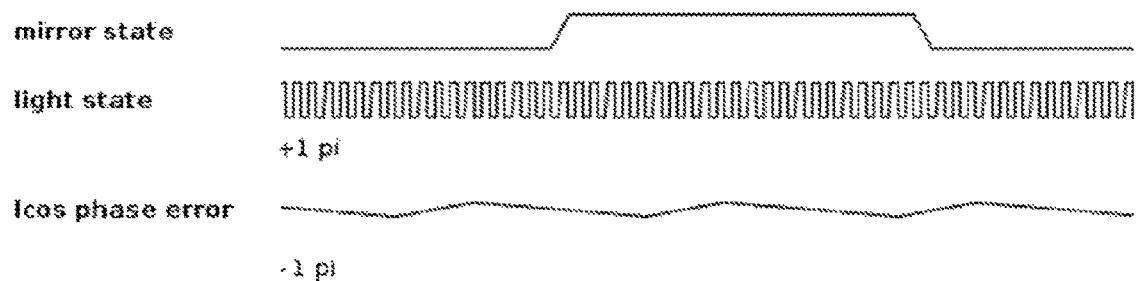
FIG. 16 is a relative timing diagram showing a phase LCoS, DMD and laser pulse combination.

FIG. 16 is a relative timing diagram for a phase LCoS, DMD and laser pulse combination. The diagram includes DMD mirror flips on the shortest possible period, light source pulses with fewer than actual for illustration purposes, and the anticipated phase drift of the LCoS-based phase modulator. The following assumptions were used for a first estimate of the overall system temporal response:

For the shortest mirror flip duration, there are about 100 light state PWM clock pulses (fewer shown in FIG. 16 for clarity) and the LCoS phase error will drift between, in this example, 0.1 π and −0.1 π an average of 1.5 times.

A 2× faster (compared to the prototype) phase LCoS SLM and faster controller chip (ASIC) are used in these visualizations along with the fast asynchronous PWM clock drive scheme introduced above.

Table 3 shows an exemplar update speed and the resulting pulse duration for the different modulation elements within the projector.

TABLE 3

Pulse durations of the different light modulation stages within the projector.

| Component | updates per second | shortest period [ms] | frame period [ms] | pulses per frame | pulses per mirror flip |
|---|---|---|---|---|---|
| DMD | 10,000 | 0.1 | 16.$\overline{66}$ | 166.$\overline{66}$ | 1 |
| LCoS | 15,000 | 0.0$\overline{66}$ | 16.$\overline{66}$ | 250 | 1.5 |
| Laser | 1,000,000 | 0.001 | 16.$\overline{66}$ | 16666.$\overline{66}$ | 100 |

The 0.1 π error (drift) in phase modulation is relatively low compared to the maximum amount of possible phase retardation of >2 π and the fast laser light source washes over even the fastest DMD mirror flips. Many alternative implementations are possible, including a Continuous Wave (CW) or constant-on laser driver, in which excess light is steered away from the active image area.

DMD-Based Experimental Prototype

An experimental prototype that combines the LCoS based phase modulator, a PWM-dimmed (order of kHz) laser light source and a DMD according to the asynchronous drive schemes, was built for demonstration purposes, and while direct timing measurements were not taken, visible temporal artifacts were not dominant enough to be noticeable. The relatively low magnitude of the phase error and the low amplitude of the phase flicker relative to its maximum of 2 π aided in masking possibly present temporal artifacts.

Figure 17:
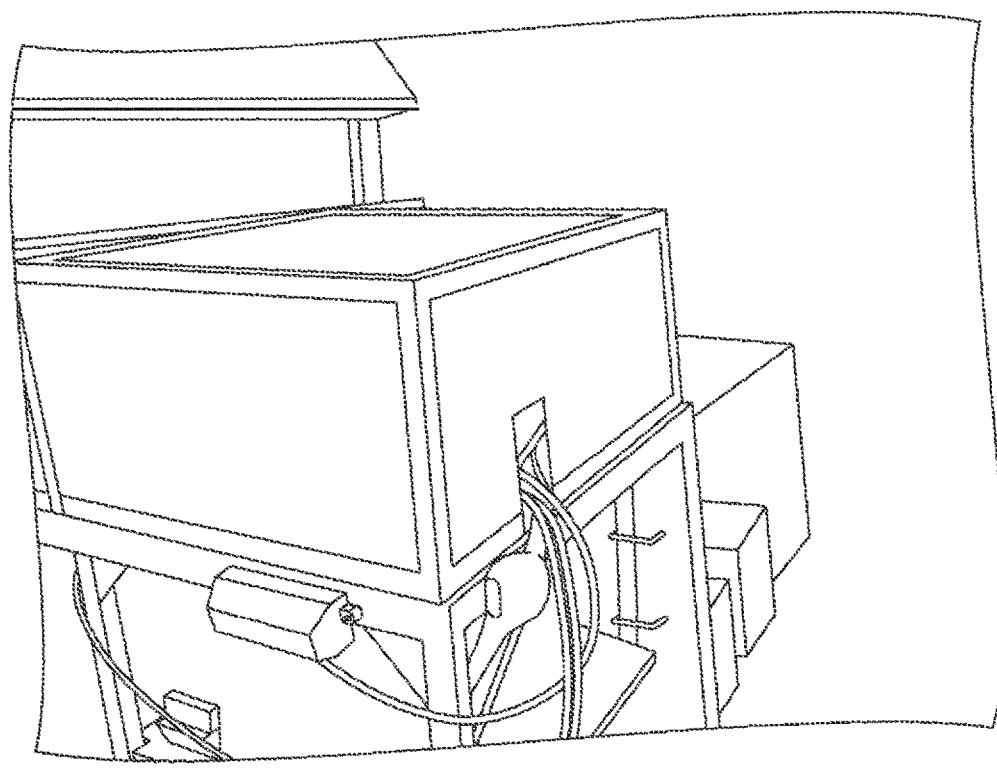
FIG. 17 is a photo of a prototype with phase LCoS and DMD amplitude modulator.

FIG. 17 is a photo of a prototype with phase LCoS and DMD amplitude modulator. The laser is coupled onto the phase modulator via a fiber (red, left side of enclosure) and its intensity is adjusted via a PWM drive scheme.

Colourimetric Calibration of the Projector

In a full colour system colourimetric calibration requires characterizing and accurately modeling the system, including the PSF, which depending on the light source and optical path could potentially be dependent on location or even image feature sizes.

Light Steering Image Formation Model

Working from light source to screen, collimated laser light is relayed from a light-source to a reflective phase modulator by a series of optics. Light leaving the phase modulator for a given colour channel is combined with light from the remaining channels and relayed through a diffuser to a Philips or RGB prism. The prism splits the light into its component colours which are each modulated by an amplitude modulator, recombined within the prism and directed into the main projection lens.

Figure 18:
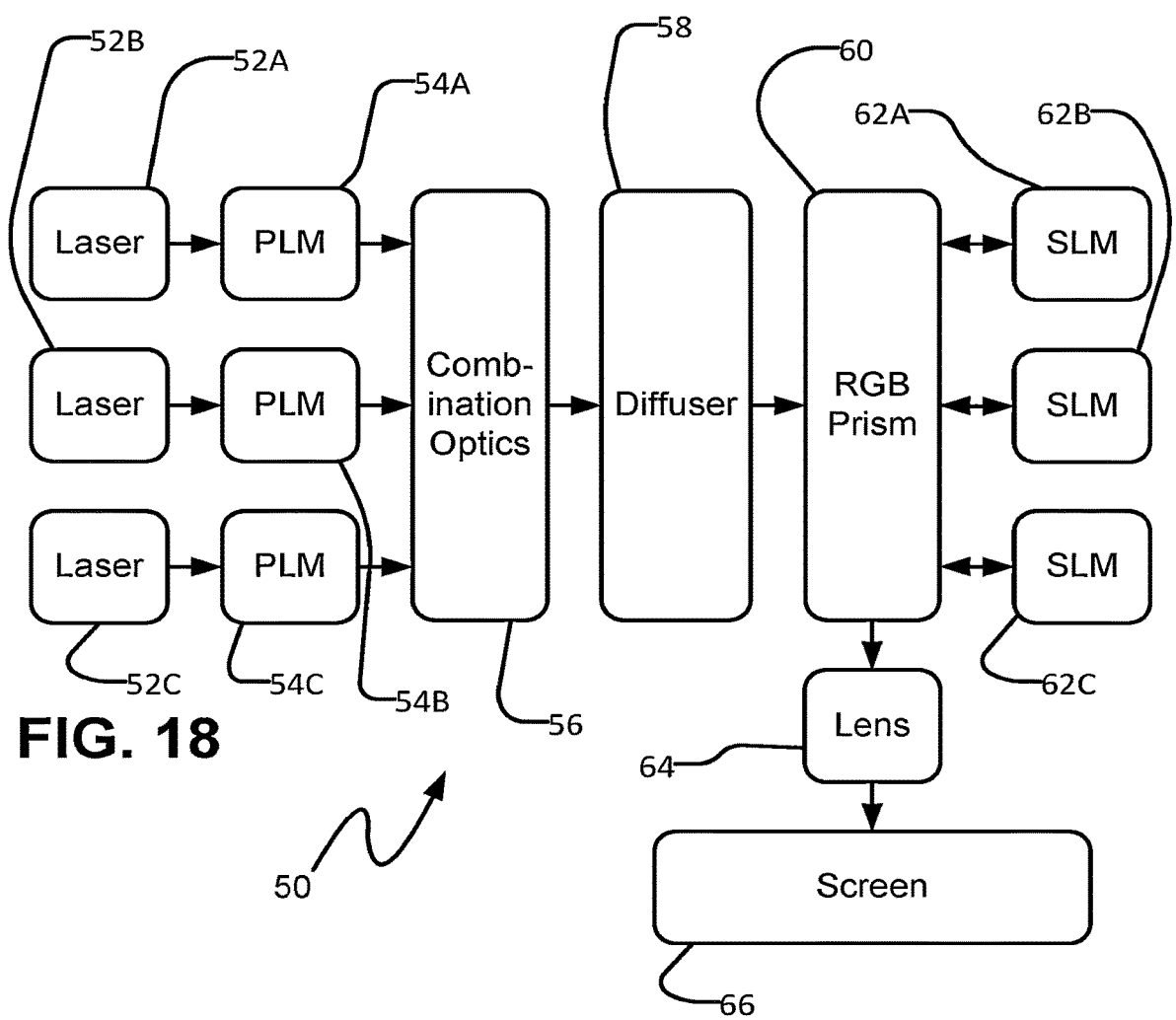
FIG. 18 is a flow chart depicting the high level optical blocks within the light path of the prototype projector from laser light source to projection lens.

FIG. 18 depicts high level optical blocks within the light path of the prototype projector 50 from laser light source to projection lens. Lasers 52A, 52B and 52C produce laser light that is directed through phase light modulators 54A, 54B and 54C respectively. In an example embodiment lasers 52A, 52B and/or 52C may be provided by laser diodes. For example, laser 52A can be a laser diode producing a wavelength of 462 nm, laser 52B a laser diode producing light at a wavelength of 520 nm, and laser 52C a laser diode producing light at a wavelength of 638 nm.

After passing through phase light modulators 54A, 54B and 54C, light from the three light paths are combined in combination optics block 56 and then diffused in diffuser 60. The diffused light passes through RGB prism 60 which separates the light into its component wavelengths. Each separate light path is directed to a corresponding spatial light modulator (SLMs 62A, 62B and 62C respectively). After modulation by the spatial light modulators, the light is recombined in RGB prism and directed into lens 64 before being projected onto screen 66. The combination of RGB light into white light was chosen for convenience and to accommodate commercially available projection hardware with pre-aligned SLMs. Better contrast performance can be expected from well-designed projectors that implement discrete RGB light paths.

This design is able to produce local intensities well above the typical full-screen intensity by virtue of phase modulators 54 which are able to introduce phase variation to the incident wavefront. This allows phase modulators 54 to function as programmable lenses in response to a software-driven phase pattern. The phase pattern is computed and attempts to redistribute light from the input illumination profile to target light profile, chosen ideally to approximate an upper-envelope of intensities in the underlying target image. This redistributes light from dark areas to bright regions which, due to properties of typical images, tend to have large dim regions and small bright highlights resulting in considerable focusing of spare light which can reach levels more than 10× of what could be achieved by a conventional projectors.

A diffuser is incorporated into the optical design to reduce speckle and also acts as a low-pass filter over the light field, since the phase modulator introduces a number of artifacts. These include fixed texture, a component of unsteered illumination and diffraction artifacts. The diffuser is effective at removing diffraction artifacts and fixed texture but generally cannot compensate for unsteered light (see FIG. 19).

Figure 19:
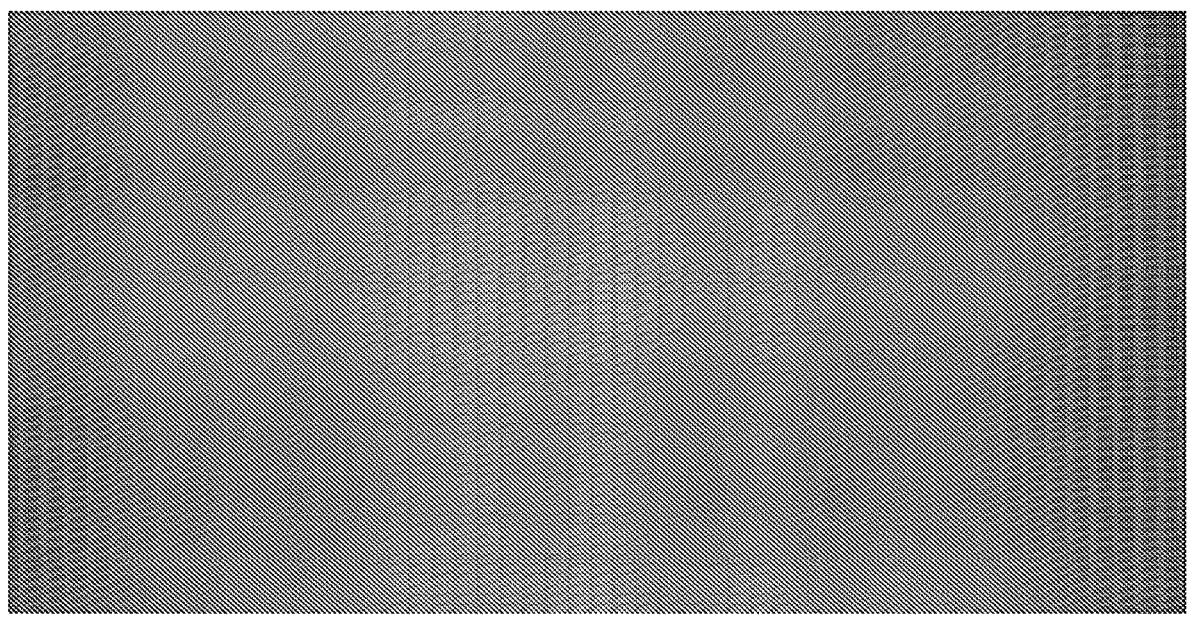
FIG. 19 is an image on a screen of the component of laser light that is not steered by the phase modulator.

FIG. 19 depicts the unsteered component of laser light of the prototype. The unsteered component is made up of laser light that is not steered by the phase modulator. The amount of light in the unsteered component is related to the illumination incident on the phase modulator after filtering by the diffuser. Typically around 10% of the light incident on the phase modulator ends up in the unsteered component Consequently the unsteered component is an important contributor to the subsequent image formation. Measurements of the unsteered component can be obtained by designing a phase pattern to steer all available light off-screen. What remains is the unsteered component (FIG. 19).

Figure 20:
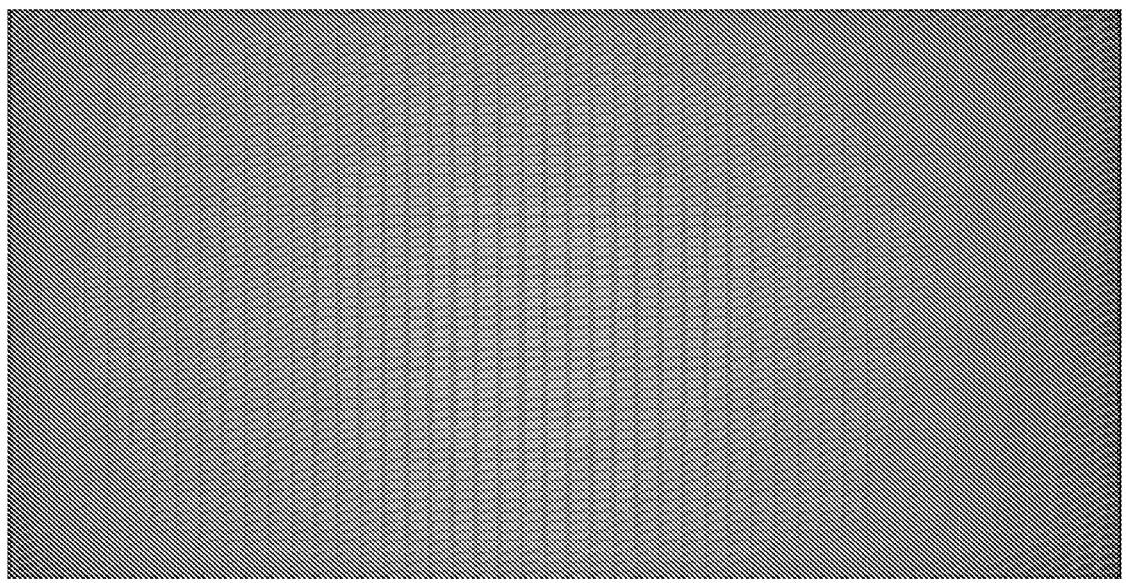
FIG. 20 is an image on a screen of the full-screen white pattern

For laser diode-based systems such as in the RGB prototype the unsteered component shows individual diode beams reflected from the phase modulator. In FIG. 19 these show as vertical (red) and horizontal (green, blue) stripes. The difference in orientation is due to differing polarization orientation of the diodes. Beams from the light source are polarized in the same direction and so all stripes are oriented similarly, by design. In case of fiber-coupled lasers the unsteered component may be significantly more uniform. FIG. 20 shows the resulting full-screen white pattern.

Optical Model

This section describes the algorithms that are used to drive the system, beginning with high-level algorithmic blocks for the overall algorithm. Main blocks are further described in dedicated subsections. Each rectangular block corresponds to a set of operations, parallelograms indicate data passed between the blocks. Solid arrows indicate known interactions between blocks while dashed arrows indicate optional connections.

High-Level Algorithm

Figure 21:
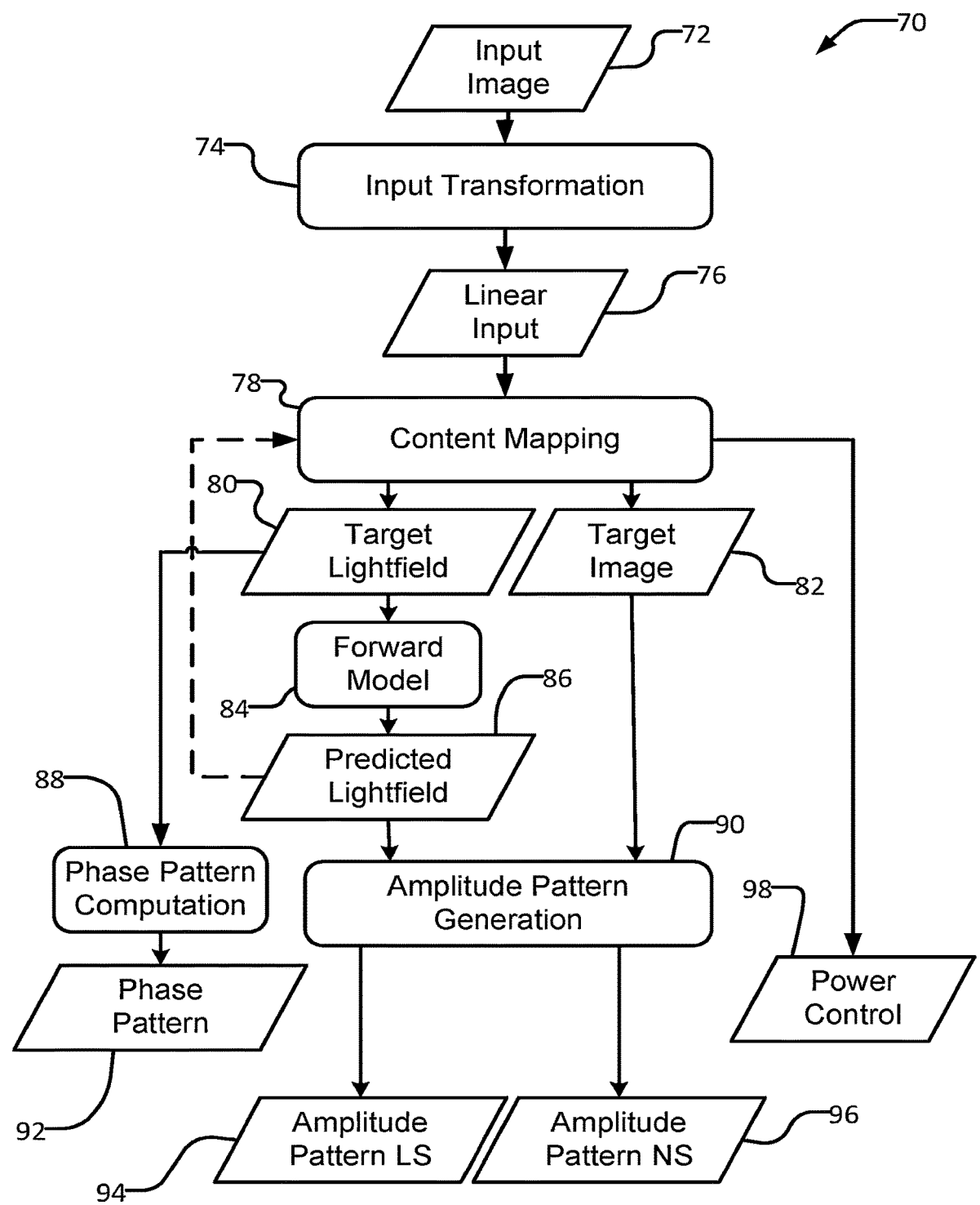
FIG. 21 shows high-level algorithm blocks for controlling the projector architecture.

FIG. 21 is a flow diagram for a high level method 70. Method 70 takes in the input image 72. Input image 72 is input to transformation block 74 which produces a linear input 76. Linear input 76 is operated on by content mapping algorithm block 78. The content mapping algorithm embodied in block 78 produces a target lightfield 80, a target image 82 and input for the power control 98.

Target lightfield 80 is acted on by forward model algorithm 84 and phase pattern computation block 88. Forward model algorithm 84 produces a predicted lightfield 86 which is returned to the content mapping algorithm 78 in an iterative process as input for recalculating the target lightfield 80 and target image 82.

Eventually, the predicted lightfield 86 is passed to amplitude pattern generation block 90 which also takes the target image 82 to generate an amplitude pattern LS 94 and amplitude pattern NS 96. Phase pattern computation block 88 generates a phase pattern 92. In the RGB prototype system, this input comprises values in the CIE 1931 XYZ colour space with Perceptual Quantization (PQ) encoding of each channel.

In the input transformation block, image data content is linearized and converted to the working colour space of the system. The output of input transformation is a linear image expressed currently in linear RGB laser primaries.

In the content mapping block the linear image is split (or distributed) between the light steering projector and the non-steering projector with a distinct amplitude pattern each in the case of two projectors or in case of an integrated system a shared amplitude pattern (one projection head with a light steering and a non-light steering light source). The output of the content mapping block is a target light field image, a target (full) image (per projector) and a power control signal. The power-control signals and target image are inter-related depending on the power-control approach that is taken.

To physically redirect light, the target light field is used as input to the phase pattern generation algorithmic block. This computes the drive parameters needed to affect light-redistribution by the phase modulators. In addition, the target light field is also used by the forward model algorithmic block, which implements a feed-forward simulation of the light steering image-formation model since, in practice, the phase modulator and subsequent optical path is unable to reproduce arbitrary target light fields exactly. The forward model produces a predicted light field image that, in combination with the target image, is used by the amplitude pattern generation block to determine the necessary amplitude patterns for both the light steering and the non-light steering block.

Input Transformation

The input transformation block functions primarily to transform the input image from the colour space in which the input is expressed (e.g. PQ encoded images in the XYZ colour space) to the colour space defined by the laser primaries. The precise transformation used will depend on the form of the input image data.

Figure 22:
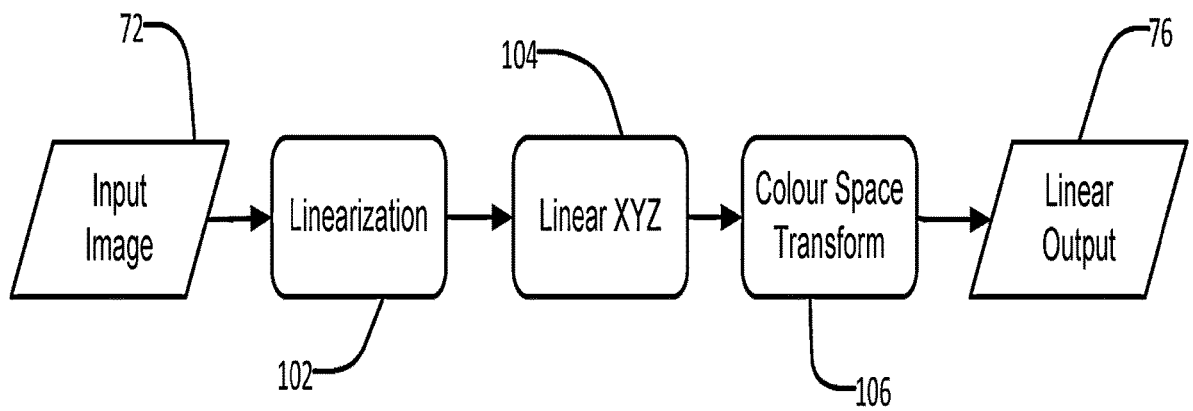
FIG. 22 shows algorithm blocks in which input transformation block takes PQ-XYZ inputs, linearizes them and transforms them to the light steering projector colour space.
Figure 22:

FIG. 22 shows algorithm blocks in which input transformation block 74 takes PQ-XYZ input image 72 and linearizes the image in linearization block 102 to produce linear XYZ output 104. The linear XYZ output is then transformed by colour space transform 106 into a linear output 76 in the light steering projector colour space.

The forward and inverse transformations for the PQ encoding are given in the following equations:

$$L = \left( \frac{P^{\frac{1}{m_2}} - c_1}{c_2 - c_3 P^{\frac{1}{m_2}}} \right)^{\frac{1}{m_1}} \quad (2)$$

$$P = \left( \frac{c_1 + c_2 L^{m_1}}{1 + c_3 L^{m_1}} \right)^{m_2} \quad (3)$$

where P and L represent PQ and linear values mapped to the range [0; 1]. These ranges should be adjusted to the nominal working range, e.g. [0, $2^{10}-1$] for 10 bit PQ and [0, 10000]cd/m² for L. The transformations can be implemented as a 1D Look Up Table (LUT), however care over the sampling rate is important to resolve all regions of the curve.

For the colour transformation, the RGB projector primaries and white point (D65) are shown in Table 4.

TABLE 4

Projector Chromaticity Coordinates

| Colour | Wavelength (nm) | Chromaticity x | Chromaticity y |
|---|---|---|---|
| Red | 638 | 0.71679 | 0.28317 |
| Green | 520 | 0.07430 | 0.83380 |
| Blue | 462 | 0.14075 | 0.03357 |
| White | n/a | 0.31271 | 0.32902 |

To obtain RGB images in laser primaries from these one can convert to the RGB projector primaries (MTTP3). This transformation may be chosen to preserve the luminance of each channel, leading to the following relationship between XYZ image:

$$\begin{bmatrix} \frac{Y_w x_w}{y_w} \\ Y_w \\ \frac{Y_w(1 - x_w - y_x)}{y_w} \end{bmatrix} = \begin{bmatrix} X_w \\ Y_w \\ Z_w \end{bmatrix} = \quad (4)$$

$$\begin{bmatrix} \frac{x_r}{y_r} & \frac{x_g}{y_g} & \frac{x_b}{y_b} \\ 1 & 1 & 1 \\ \frac{(1 - x_r - y_r)}{y_r} & \frac{(1 - x_g - y_g)}{y_g} & \frac{(1 - x_b - y_b)}{y_b} \end{bmatrix} \begin{bmatrix} Y_r \\ Y_g \\ Y_b \end{bmatrix}$$

where $[X_w, Y_w, Z_w]^T$ is the luminance of the combined image and $[Y_r, Y_g, Y_b]^T$ is the luminance of each channel treated independently under the constraint that $Y_w = Y_r + Y_g + Y_b$. The per-channel luminances $[Y_r, Y_g, Y_b]^T$ corresponding to $Y_w = 1$ can then be found by solving the system above.

The per-channel luminance values are used to define the transformation M from MTTP3 to XYZ. This transformation can be defined as follows:

$$\begin{bmatrix} X_r & X_g & X_b \\ Y_r & Y_g & Y_b \\ Z_r & Z_g & Z_b \end{bmatrix} = M \begin{bmatrix} Y_r & 0 & 0 \\ 0 & Y_g & 0 \\ 0 & 0 & Y_b \end{bmatrix}, \quad (5)$$

meaning that input images in which each channel stores the luminance of its corresponding primary should map to the chromaticity of the primary at the luminance stored in the image. The transformation can be found using $$M = \begin{bmatrix} X_r & X_g & X_b \\ Y_r & Y_g & Y_b \\ Z_r & Z_g & Z_b \end{bmatrix} \begin{bmatrix} \frac{1}{Y_r} & 0 & 0 \\ 0 & \frac{1}{Y_g} & 0 \\ 0 & 0 & \frac{1}{Y_b} \end{bmatrix}. \quad (6)$$

For the chromaticities and white point listed above, this gives the following result for M:

$$M = \begin{bmatrix} 2.5313 & 0.0891 & 4.1927 \\ 1.0000 & 1.0000 & 1.0000 \\ 0.0001 & 0.1102 & 24.5958 \end{bmatrix} \quad (7)$$

Similarly, the inverse mapping from XYZ to MTTP3 can be expressed as:

$$M^{-1} = \begin{bmatrix} 0.4064 & -0.0287 & -0.0681 \\ -0.4082 & 1.0333 & 0.0276 \\ 0.0018 & -0.0046 & 0.0405 \end{bmatrix} \quad (8)$$

Content Mapping

Content mapping block 78 takes as input the linear input image and determines the split between the light steering and the non-light steering projectors as well as the power levels required.

Figure 23:
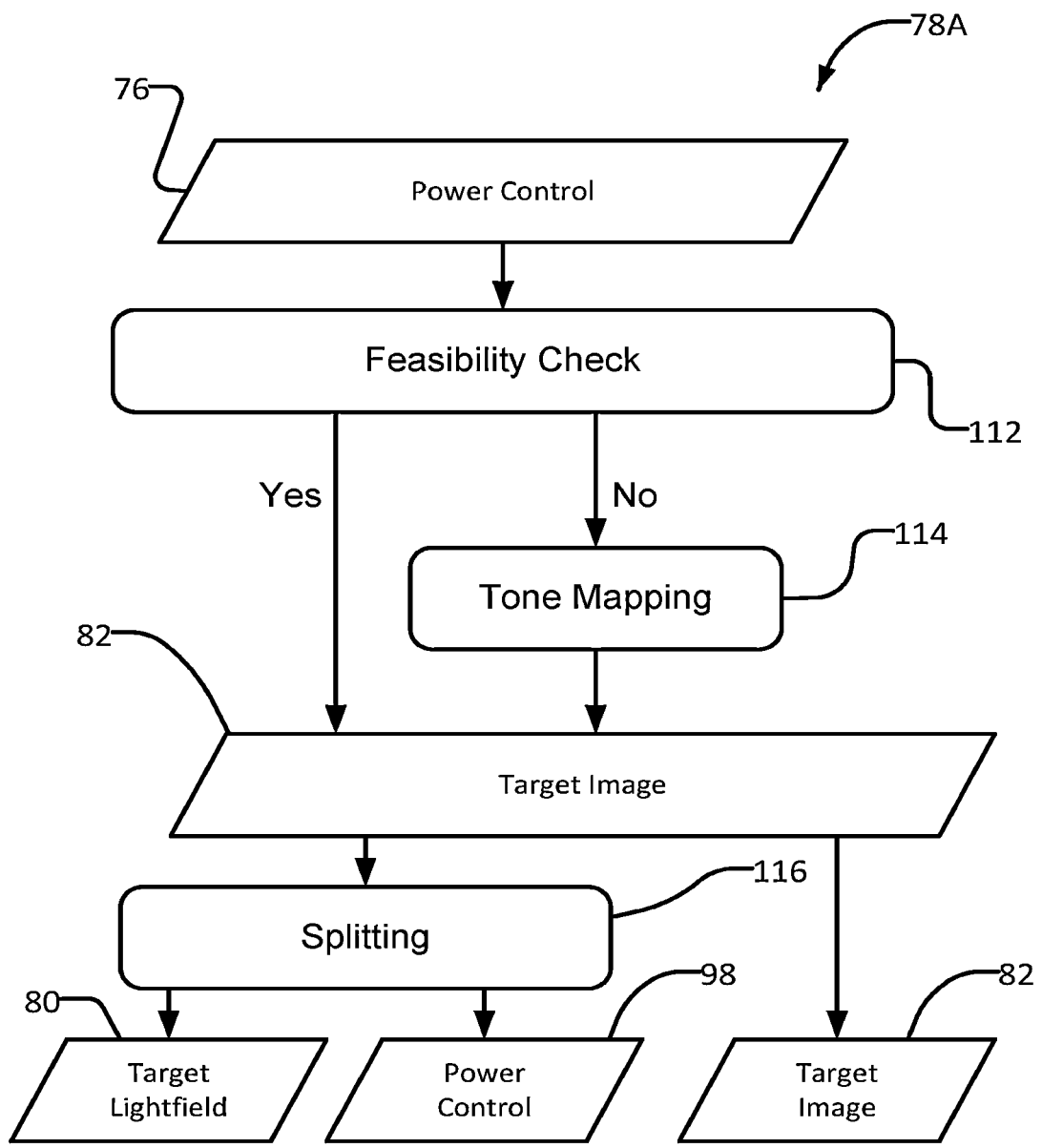
FIG. 23 shows a content mapping algorithm block.

FIG. 23 shows details of an example algorithm 78A that may be applied to implement content mapping block 78. Algorithm 78A first takes linear input 76 and checks if the input image is feasible given the system power budget. This is currently done using a power heuristic. If not, the input is tone-mapped 114. Tone mapping 114 may, for example, comprise simple scaling although more sophisticated tone mapping algorithms may also be applied. The resulting target image 82 (either passed through or tone-mapped) is then the target light field for subsequent stages. For feasible input content, the linear input and target images are identical. Target image 82 is then used to generate a target lightfield image 80. Target image 82 is split between non-steering and steering systems. The splitting function 116 produces a target lightfield 80 and information for power control 98.

Figure 24:
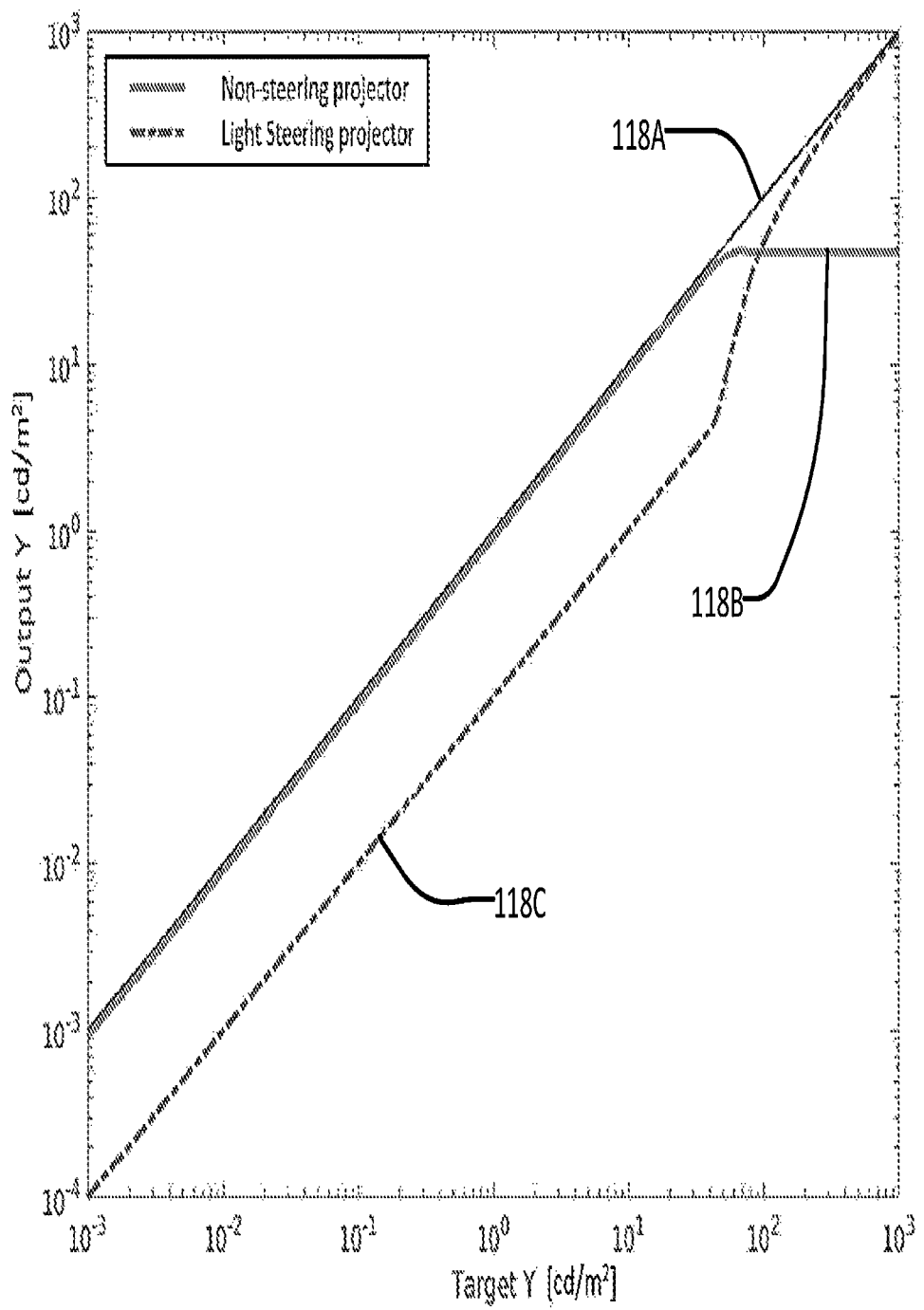
FIG. 24 is a graph of steering and non-steering splitting as a function of target luminance in cd/m².

The split between steering and non-steering may be achieved, for example, by raising the target image to an exponent ($\gamma$>1) to determine the light steering image. This does not accurately reproduce light steering projector data since it distorts the content to emphasize highlights. A more accurate (and light efficient) splitting may be obtained by using the non-steering projector for most of the image formation up to a threshold illumination level (e.g. 48 cd/m$^2$) and gradually phasing in the light steering projector as illumination level is increased. For example, FIG. 24 is a graph of an example steering and non-steering splitting as a function of target luminance in cd/m$^2$. Note the log-log scale.

In the example embodiment of FIG. 24, splitting function 116 attempts to utilize the non-steering projector for 90% of image formation up to 47 cd/m$^2$, at which point the steering projector begins to take over. It is desirable to use the steering projector for a portion of the image at every pixel in order to avoid bright image features having a painted-on appearance. The splitting is 1D and could be implemented as a function or as a LUT.

Forward Model

Figure 25:
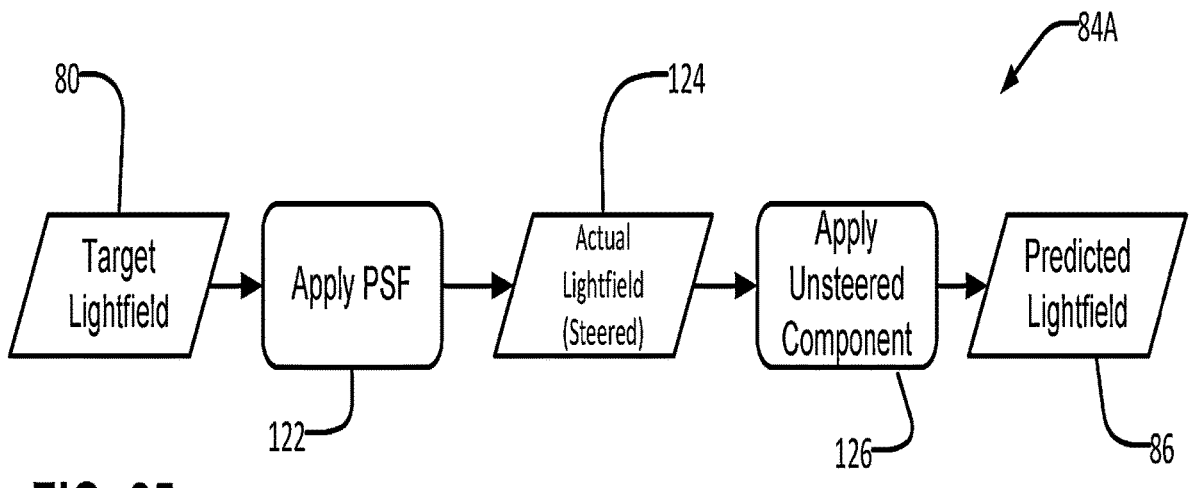
FIG. 25 shows a forward model algorithm block.

FIG. 25 is an illustration of an example algorithm 84A that may be applied to implement forward model algorithm block 84. Forward model block 84 takes as input target light field 80 from content mapping block 78 and uses it to predict the output of the optical system, referred to as the predicted light field 86.

Computing a predicted light field 86 is beneficial since not all target light fields are achievable. A predicted light field 86 may be used to compute the correct amplitude patterns. Predicted light field 86 may be compared to target light field 80 to identify how the actual light field differs from the target light field. Algorithm 84A comprises applying the calibrated system PSF 122 and the actual lightfield (steered) 124, and the unsteered component 126 to the output image, taking care to account for overall power-levels.

Figure 26:
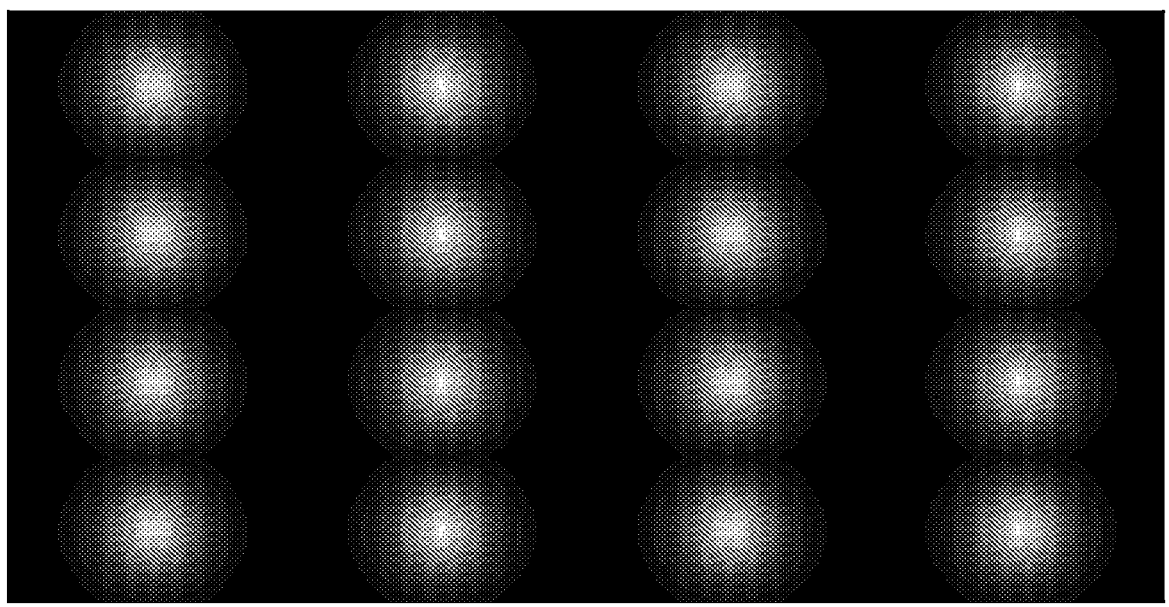
FIG. 26 shows a point spread function applied to a test pattern.

The forward model takes the target light field 80 as input and applies the system PSF 122 to it to predict the result of the actual light field after blurring by the diffuser. An example of the PSF of the RGB projector system is shown in FIG. 26, tiled into a 4×4 pattern. The PSF for red, green and blue colour channels may have different sizes and/or shapes.

The resulting light field then has the effect of the unsteered component 126 added. This is added after blurring since measurement of this image can only be accomplished after passing through the diffuser. In the current system, the fixed pattern is highly non-uniform. In a fiber-coupled system it would approximate a Gaussian profile.

Phase Pattern Computation

Figure 27:
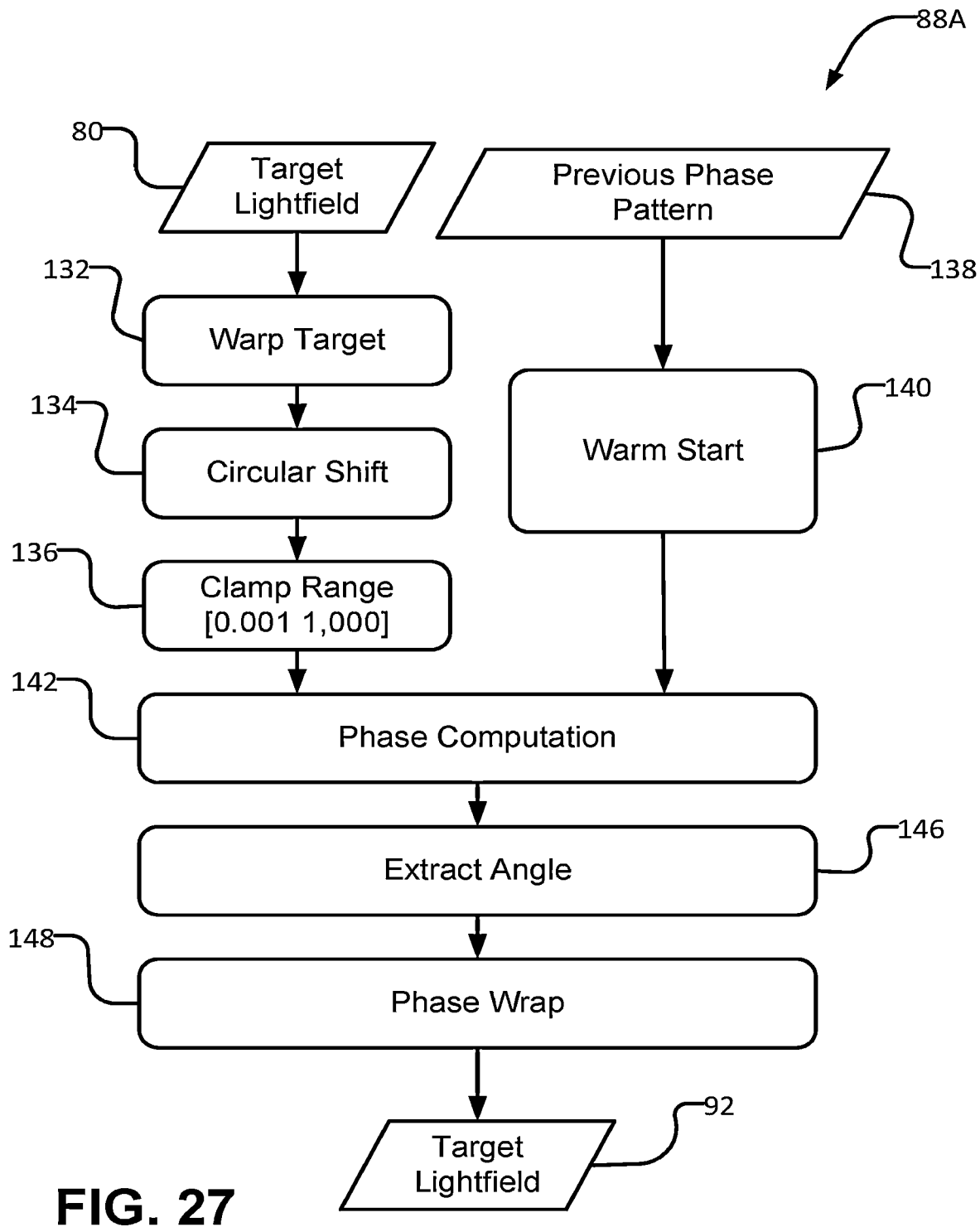
FIG. 27 shows a phase pattern computation block.

Phase pattern generation block 88 calculates the phase patterns required to achieve a target light field. FIG. 27 shows an example algorithm 88A that may be applied to provide phase pattern computation block 88.

In order to frame the image correctly on the amplitude modulator and separate out higher diffraction orders it is desirable to pre-process the target light field 80. This involves warping 132 by a calibrated distortion intended to align the three channels. For example, each point in the target image [x, y], of dimensions W×H may be mapped to a point in the source image, [$x_m$, $y_m$], by a 2D cubic polynomial:

$$x_n = \frac{x}{W} \quad (9)$$

$$y_n = \frac{y}{H} \quad (10)$$

$$b = \left[1, x_n, y, x_n^2, x_n y_n, y_n^2, x_n^3, x_n^2 y_n, x_n y_n^2, y_n^3\right]^T \quad (11)$$

$$x_m = b^T \beta_x \quad (12)$$

$$y_m = b^T \beta_y \quad (13)$$

The source image may then be linearly sampled at the [$x_m$, $y_m$] corresponding to each destination pixel x, y. Normalization of the target coordinates (the [$x_n$, $y_n$] coordinates), allows the mapping to be computed even for resolution mismatches between source and target images. The 10×1 fit parameter vectors $\beta_x$ and $\beta_y$ are obtained from calibration. Once warped and resampled, the resulting image is circularly shifted 134 (depending on the optical configuration), clamped to a suitable range (such as [0.001, 1000.0]) 136. At this point the phase computation algorithm 142 is applied. The final phase pattern is then mapped to the output range of the phase panels.

Amplitude Pattern Generation

Figure 28:
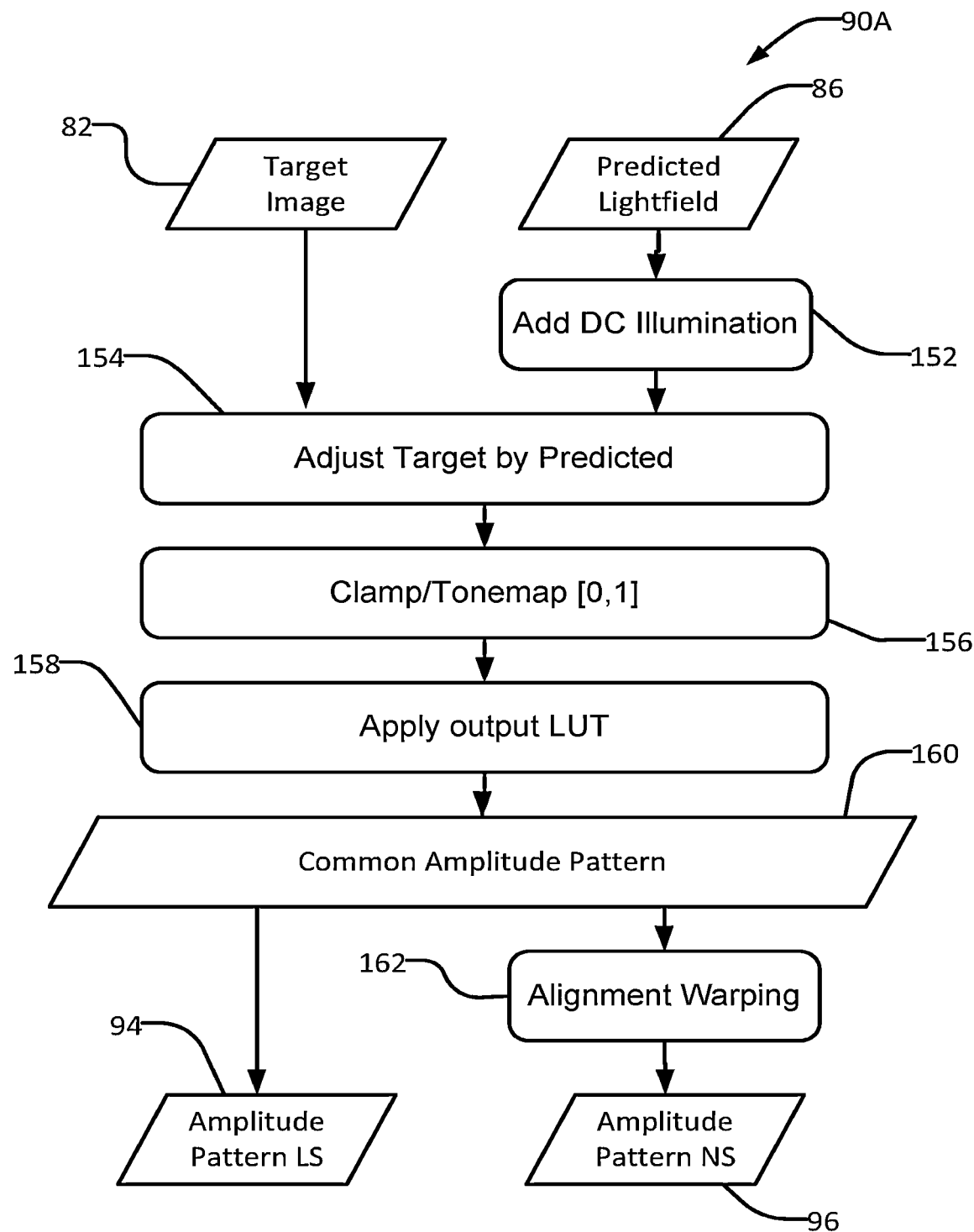
FIG. 28 shows an amplitude pattern generation block.

Amplitude pattern generation block 90 determines the amplitude pattern for the steering projector and the non-steering projector using the target image and the predicted light field as input. FIG. 28 illustrates an example algorithm 90A that may be provided to implement amplitude pattern generation block 90.

Algorithm 90A first adds the non-steering illumination 152 to the predicted light field 86. This is the total light available on-screen. The target image 82 is adjusted to account for the predicted lightfield 86. A common amplitude pattern 160 is then computed for both the light steering and the non-light steering amplitude modulator. The resulting image is clamped 156 to a valid range of transmission factors (e.g. [0,1]), (or could be tone-mapped in order to preserve texture in out-of-range regions). Any necessary LUTs are then applied 158 to account for the response of the amplitude SLMs and the pattern is then directly sent to the projection head. In order to spatially align the steering and the non-steering projectors, an alignment warping 162 may be used based on calibrated pixel correspondences. Alignment warping 162 may use the same cubic warping function as in the phase pattern generation block. This results in a light steering (LS) amplitude pattern 94, and a non-steered (NS) amplitude pattern 96.

Results

Figure 29A:
FIG. 29A shows a first frame from a movie displayed on the light steering prototype (left) and on a traditional projector with same power out of lens (right).
Figure 29B:
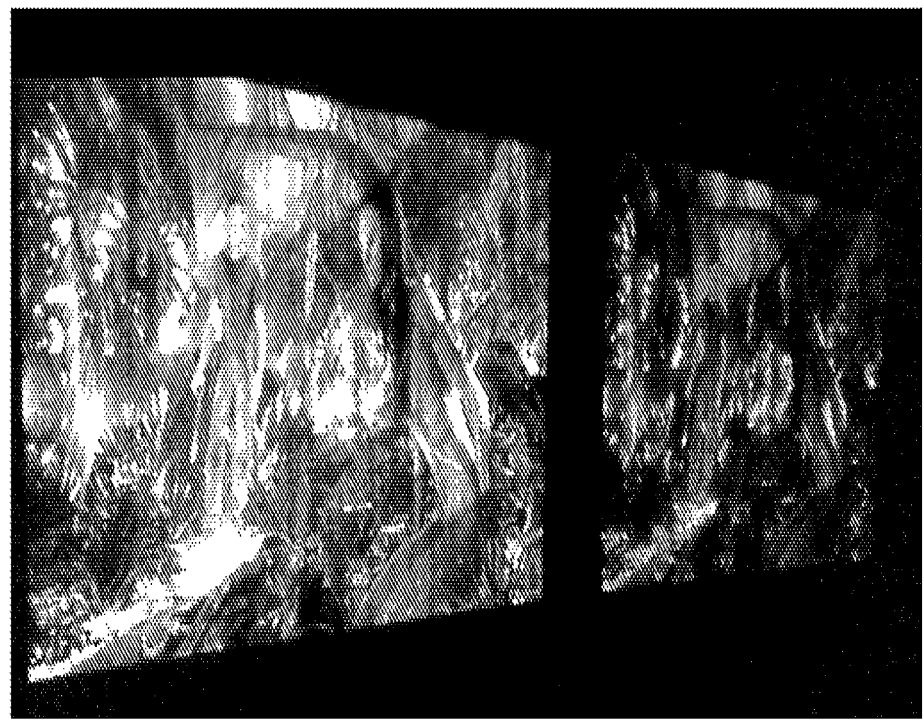
FIG. 29B shows a first frame from a movie displayed on the light steering prototype (left) and on a traditional projector with same power out of lens (right).

FIGS. 29A and 29B show photos comparing a cinema projector and a prototype light steering projector side-by-side, both with the same optical power out of lens, playing a video processed using the algorithm framework introduced in this section. FIGS. 29A and 29B each show a frame from a movie displayed on the light steering prototype (left) and on a traditional projector with same power out of lens (right). The light steering projector (left) exceeds the comparison projector contrast and peak luminance significantly by about a factor of 20 (light steering projector: 1,000 cd/m²; right projector: 48 cd/m²).

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a projector may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, video projectors, audio-visual receivers, displays (such as televisions), digital cinema projectors, media players, and other devices suitable for the purposes described herein.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, light modulator, lens, projector head, prism, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention comprises a number of non-limiting aspects. Aspects of the invention include, without limitation:

1. An image projection system comprising:
    a first projector operative to project first modulated light onto a screen, the first projector comprising a first spatial light modulator;
    a second projector operative to project second modulated light onto the screen superposed with the first modulated light, the second projector comprising a light steering module;
    a controller operative to process image data comprising pixel values defining target illumination levels for a target image to be displayed and to generate control signals for the first spatial light modulator and the light steering modulator wherein the processing comprises splitting light output between the first and second projectors in such a manner that the second modulated light includes a portion of the light for each of the pixels of the image and the first modulated light makes up a majority of the light for those pixels of the image for which the target illumination level is less than a first threshold level.
2. The image projection system according to aspect 1 wherein the controller is configured to generate a modified target image by processing comprising raising the pixel values defining the target image to the power $\gamma$ where $\gamma>1$ and to base the control signals for the second projector on the modified target image.
3. The image projection system according to aspect 1 wherein the controller is configured to perform the splitting on a pixel-by-pixel basis based on the target illumination levels.
4. The image projection system according to aspect 2 wherein the controller is configured to maintain a fixed ratio of luminance of the second modulated light to luminance of the first modulated light for pixels having target illumination levels below the first threshold level.
5. The image projection system according to aspect 4 wherein the controller is configured to control the second projector so that the ratio of the second modulated light to the first modulated light exceeds the fixed ratio for pixels having target illumination levels exceeding the first threshold.
6. The image projection system according to aspect 4 or 5 wherein the fixed ratio is less than 20%.
7. The image projection system according to any one of aspects 1 to 6 wherein a maximum achievable illumination level by the second projector for any pixel of the second modulated light is at least 10 times greater than a maximum achievable illumination level by the first projector for any pixel of the first modulated light.
8. The image projection system according to any one of aspects 1 to 7 wherein the controller comprises a lookup table (LUT) and the controller is configured to split the light output between the first and second light projectors based on outputs from the LUT.
9. The image projection system according to any of aspects 1 to 7 wherein the second projector comprises a second spatial light modulator, the controller is configured to apply an alignment warping to the image data to yield warped image data and to drive the second spatial light modulator using the warped image data.
10. The image projection system according to any one of aspects 1 to 9 wherein the controller is configured to perform a check to determine whether display of the target image is feasible and, if the check determines that display of the target image is not feasible the controller is configured to perform tone mapping on the image data to yield tone mapped image data and to continue the processing with the tone mapped image data.
11. The image projection system according to any one of aspects 1 to 10 wherein the first projector comprises a broadband light source.
12. The image projection system according to aspect 11 wherein the broadband light source is arranged to illuminate the first spatial light modulator uniformly.
13. The image projection system according to aspect 11 or 12 wherein the broadband light source comprises a source of white light.
14. The image projection system according to any one of aspects 1 to 13 wherein the second projector comprises a narrowband light source.
15. The image projection system according to aspect 14 wherein the narrowband light source comprises one or more laser diodes.
16. The image projection system according to aspect 15 wherein the narrowband light source comprises red-light-emitting, green-light-emitting and blue-light-emitting laser diodes.
17. The image projection system according to aspect 16 wherein the light steering module comprises a plurality of phase modulators and light emitted by the red-light-emitting, green-light-emitting and blue-light-emitting laser diodes is respectively steered by first, second and third ones of the plurality of phase modulators.
18. The image projection system according to aspect 16 or 17 wherein the controller implements a forward model that computes a predicted light field for light that has been steered by the light steering module, the forward model comprising separate point spread functions for light emitted by the red-light-emitting, green-light-emitting and blue-light-emitting laser diodes.
19. The image projection system according to aspect 18 wherein the forward model is an iterative model.
20. The image projection system according to aspect 18 or 19 wherein the forward model models a steered component of light from the light steering module and an unsteered component of the light from the light steering module.
21. The image projection system according to any one of aspects 1 to 20 wherein the first and second projectors share a common projector head.
22. An image projection method, the method comprising:
projecting first modulated light onto a screen using a first projector comprising a first spatial light modulator;
projecting second modulated light onto the screen superposed with the first modulated light using a second projector comprising a light steering module;
processing image data comprising pixel values defining target illumination levels for a target image to be displayed, the processing comprising splitting light output between the first and second projectors in such a manner that the second modulated light includes a portion of the light for each of the pixels of the image and the first modulated light makes up a majority of the light for those pixels of the image for which the target illumination level is less than a first threshold level; and
generating control signals for the first spatial light modulator and the light steering modulator.
23. The image projection method according to aspect 22 further comprising generating a modified target image by raising the pixel values defining the target image to the power γ where γ>1 and basing the control signals for the second projector on the modified target image.
24. The image projection method according to aspect 22 wherein the splitting is performed on a pixel-by-pixel basis based on the target illumination levels.
25. The image projection method according to aspect 23 further comprising maintaining a fixed ratio of luminance of the second modulated light to luminance of the first modulated light for pixels having target illumination levels below the first threshold level.
26. The image projection method according to aspect 25 further comprising controlling the second projector so that the ratio of the second modulated light to the first modulated light exceeds the fixed ratio for pixels having target illumination levels exceeding the first threshold.
27. The image projection method according to aspect 25 or 26 wherein the fixed ratio is less than 20%.
28. The image projection method according to any one of aspects 22 to 27
wherein a maximum achievable illumination level by the second projector for any pixel of the second modulated light is at least 10 times greater than a maximum achievable illumination level by the first projector for any pixel of the first modulated light.
29. The image projection method according to any one of aspects 22 to 28 further comprising splitting the light output between the first and second light projectors based on outputs from a lookup table.
30. The image projection method according to any one of aspects 22 to 28 further comprising:
applying an alignment warping to the image data to yield warped image data; and
driving a second spatial light modulator of the second projector using the warped image data.
31. The image projection method according to any one of aspects 22 to 30 further comprising performing a check to determine whether display of the target image is feasible and, if the check determines that display of the target image is not feasible performing tone mapping on the image data to yield tone mapped image data and continuing the processing with the tone mapped image data.

32. The image projection method according to any one of aspects 22 to 31 wherein the first projector comprises a broadband light source.
33. The image projection method according to aspect 32 further comprising operating the broadband light source to illuminate the first spatial light modulator uniformly.
34. The image projection method according to aspect 32 or 33 wherein the broadband light source comprises a source of white light.
35. The image projection method according to any one of aspects 22 to 34 wherein the second projector comprises a narrowband light source.
36. The image projection method according to aspect 35 wherein the narrowband light source comprises one or more laser diodes and the method comprises operating the laser diodes to illuminate one or more phase modulations of the light steering module.
37. The image projection method according to aspect 36 wherein the narrowband light source comprises red-light-emitting, green-light-emitting and blue-light-emitting laser diodes.
38. The image projection method according to aspect 37 further comprising steering light emitted by the red-light-emitting, green-light-emitting and blue-light-emitting laser diodes using first, second and third phase modulators respectively of a plurality of phase modulators of the light steering module.
39. The image projection method according to aspect 37 or 38 further comprising implementing a forward model that computes a predicted light field for light that has been steered by the light steering module, the forward model comprising separate point spread functions for light emitted by the red-light-emitting, green-light-emitting and blue-light-emitting laser diodes.
40. The image projection method according to aspect 39 wherein the forward model is an iterative model.
41. The image projection method according to aspect 39 or 40 wherein the forward model models both a steered component of light from the light steering module and an unsteered component of the light from the light steering module.
42. The image projection method according to any one of aspects 22 to 41 wherein the first and second projectors share a common projector head.
43. The image projection method according to any one of aspects 22 to 42 wherein the first modulated light and second modulated light are spatially modulated at equal spatial resolutions.
44. Apparatus having any new and inventive feature, combination of features, or sub-combination of features as described herein.
45. Methods having any new and inventive steps, acts, combination of steps and/or acts or sub-combination of steps and/or acts as described herein.

What is claimed is:

1. An image projection system comprising:
a first projector operative to project first modulated light onto a screen, the first projector comprising a first spatial light modulator;
a second projector operative to project second modulated light onto the screen superposed with the first modulated light, the second projector comprising a light steering module;
a controller operative to process image data comprising pixel values defining target illumination levels for a target image to be displayed and to generate control signals for the first spatial light modulator and the light steering module, wherein the processing comprises splitting light output between the first and second projectors in such a manner that the second modulated light includes a portion of the light for each of the pixels of the image and the first modulated light makes up a majority of the light for those pixels of the image for which the target illumination level is less than a first threshold level,
wherein the processing of the image data further includes splitting the target image into a light steering image portion for illumination by the second modulated light and a light non-steering image portion for illumination by the first modulated light, wherein the splitting of the target image is based on a function or look-up table.

2. The image projection system according to claim 1 wherein the controller is configured to generate a modified target image by processing comprising raising the pixel values defining the target image to the power γ where γ>1 and to base the control signals for the second projector on the modified target image.

3. The image projection system according to claim 1 wherein the controller is configured to perform the splitting on a pixel-by-pixel basis based on the target illumination levels.

4. The image projection system according to claim 2 wherein the controller is configured to maintain a fixed ratio of luminance of the second modulated light to luminance of the first modulated light for pixels having target illumination levels below the first threshold level.

5. The image projection system according to claim 4 wherein the controller is configured to control the second projector so that the ratio of the second modulated light to the first modulated light exceeds the fixed ratio for pixels having target illumination levels exceeding the first threshold.

6. The image projection system according to claim 5, wherein the fixed ratio is less than 20%.

7. The image projection system according to claim 1 wherein a maximum achievable illumination level by the second projector for any pixel of the second modulated light is at least 10 times greater than a maximum achievable illumination level by the first projector for any pixel of the first modulated light.

8. The image projection system according to claim 1 wherein the controller comprises the lookup table (LUT) and the controller is configured to split the light output between the first and second light projectors based on outputs from the LUT.

9. The image projection system according to claim 1 wherein the second projector comprises a second spatial light modulator, the controller is configured to apply an alignment warping to the image data to yield warped image data and to drive the second spatial light modulator using the warped image data.

10. The image projection system according to claim 1 wherein the controller is configured to perform a check to determine whether display of the target image is feasible and, if the check determines that display of the target image is not feasible the controller is configured to perform tone mapping on the image data to yield tone mapped image data and to continue the processing with the tone mapped image data.

11. The image projection system according to claim 1 wherein the first projector comprises a broadband light source.

12. The image projection system according to claim 11 wherein the broadband light source is arranged to illuminate the first spatial light modulator uniformly.

13. The image projection system according to claim 11 wherein the broadband light source comprises a source of white light.

14. The image projection system according to claim 1 wherein the second projector comprises a narrowband light source.

15. The image projection system according to claim 14 wherein the narrowband light source comprises one or more laser diodes.

16. The image projection system according to claim 15 wherein the narrowband light source comprises red-light-emitting, green-light-emitting and blue-light-emitting laser diodes.

17. The image projection system according to claim 16 wherein the light steering module comprises a plurality of phase modulators and light emitted by the red-light-emitting, green-light-emitting and blue-light-emitting laser diodes is respectively steered by first, second and third ones of the plurality of phase modulators.

18. The image projection system according to claim 16 wherein the controller implements a forward model that computes a predicted light field for light that has been steered by the light steering module, the forward model comprising separate point spread functions for light emitted by the red-light-emitting, green-light-emitting and blue-light-emitting laser diodes.

19. The image projection system according to claim 18 wherein the forward model is an iterative model.

20. The image projection system according to claim 18 wherein the forward model models a steered component of light from the light steering module and an unsteered component of the light from the light steering module.

* * * * *